United States Patent
Boehringer et al.

(10) Patent No.: US 9,242,202 B2
(45) Date of Patent: Jan. 26, 2016

(54) ADSORPTIVE FILTER MEDIUM

(71) Applicant: Blücher GmbH, Erkrath (DE)

(72) Inventors: Bertram Boehringer, Wuppertal (DE);
Omar Guerra Gonzalez, Düsseldorf (DE); Isebill Eckle, Gelsenkichen (DE)

(73) Assignee: BLÜCHER GMBH, Erkrath (DE)

( * ) Notice: Subject to any disclaimer, the term of this patent is extended or adjusted under 35 U.S.C. 154(b) by 0 days.

(21) Appl. No.: 14/388,619

(22) PCT Filed: Dec. 27, 2012

(86) PCT No.: PCT/EP2012/005385
§ 371 (c)(1),
(2) Date: Sep. 26, 2014

(87) PCT Pub. No.: WO2013/143570
PCT Pub. Date: Oct. 3, 2013

(65) Prior Publication Data
US 2015/0053080 A1 Feb. 26, 2015

(30) Foreign Application Priority Data

Mar. 28, 2012 (DE) .......................... 10 2012 006 160
Apr. 17, 2012 (DE) .......................... 10 2012 007 503

(51) Int. Cl.
*B01D 53/02* (2006.01)
*B01D 53/04* (2006.01)
(Continued)

(52) U.S. Cl.
CPC ............ *B01D 53/0407* (2013.01); *B01D 53/02* (2013.01); *B01J 20/06* (2013.01); *B01J 20/08* (2013.01); *B01J 20/103* (2013.01); *B01J 20/18* (2013.01); *B01J 20/20* (2013.01); *B01J 20/226* (2013.01); *B01J 20/28042* (2013.01); *B01J 20/28047* (2013.01); *B01J 20/28052* (2013.01); *B01J 20/28057* (2013.01); *B01J 20/28069* (2013.01); *B01J 39/00* (2013.01); *B01J 41/00* (2013.01); *B01D 2239/0407* (2013.01);
(Continued)

(58) Field of Classification Search
CPC ................. B01D 2239/0407; B01D 2239/065; B01D 2239/1291; B01D 2253/102; B01D 2253/25; B01D 2253/30; B01D 2253/304; B01D 2253/306; B01D 2253/311; B01D 2253/34; B01D 2257/93; B01D 2258/06; B01D 2259/4508; B01D 2259/4533; B01D 2259/4541; B01D 2259/4583; B01D 53/02; B01D 53/0407; B01J 20/06; B01J 20/08; B01J 20/103; B01J 20/18; B01J 20/20; B01J 20/226; B01J 20/28042; B01J 20/28047; B01J 20/28052; B01J 20/28057; B01J 20/28069; B01J 39/00; B01J 41/00
See application file for complete search history.

(56) References Cited

U.S. PATENT DOCUMENTS

| 4,880,608 | A | * | 11/1989 | Stelman | ................. | B01D 53/60 422/216 |
| 5,141,724 | A | * | 8/1992 | Audeh | .................. | B01D 53/02 423/210 |

(Continued)

*Primary Examiner* — Christopher P Jones
(74) *Attorney, Agent, or Firm* — Edward E. Sowers; Brannon Sowers & Cracraft PC

(57) ABSTRACT

The invention relates to an adsorptive filter medium (i.e. a filter unit or filter structure) which is suitable for purifying gases and/or gas mixtures, preferably air, and also for removing chemical and/or biological poisons and/or pollutants from gases and/or gas mixtures, preferably air, and also to the use thereof.

23 Claims, 6 Drawing Sheets

(51) Int. Cl.
   *B01J 39/00* (2006.01)
   *B01J 41/00* (2006.01)
   *B01J 20/06* (2006.01)
   *B01J 20/08* (2006.01)
   *B01J 20/18* (2006.01)
   *B01J 20/20* (2006.01)
   *B01J 20/22* (2006.01)
   *B01J 20/28* (2006.01)
   *B01J 20/10* (2006.01)

(52) U.S. Cl.
   CPC ... *B01D2239/065* (2013.01); *B01D 2239/1291* (2013.01); *B01D 2253/102* (2013.01); *B01D 2253/25* (2013.01); *B01D 2253/30* (2013.01); *B01D 2253/304* (2013.01); *B01D 2253/306* (2013.01); *B01D 2253/311* (2013.01); *B01D 2253/34* (2013.01); *B01D 2257/93* (2013.01); *B01D 2258/06* (2013.01); *B01D 2259/4508* (2013.01); *B01D 2259/4533* (2013.01); *B01D 2259/4541* (2013.01); *B01D 2259/4583* (2013.01)

(56) References Cited

U.S. PATENT DOCUMENTS

| | | | |
|---|---|---|---|
| 6,503,297 B1* | 1/2003 | Lu | B01D 53/0446 95/106 |
| 2002/0078931 A1* | 6/2002 | Makino | B01D 53/02 123/519 |
| 2003/0056649 A1* | 3/2003 | Lee | B01D 53/0423 95/90 |
| 2006/0249027 A1* | 11/2006 | Adolphsen | B01D 53/0415 96/134 |
| 2008/0271602 A1* | 11/2008 | Tatarchuk | B01D 53/02 95/135 |
| 2009/0308812 A1* | 12/2009 | Osaheni | B01D 15/00 210/660 |
| 2010/0083697 A1* | 4/2010 | Degenstein | B01D 53/002 62/636 |

* cited by examiner

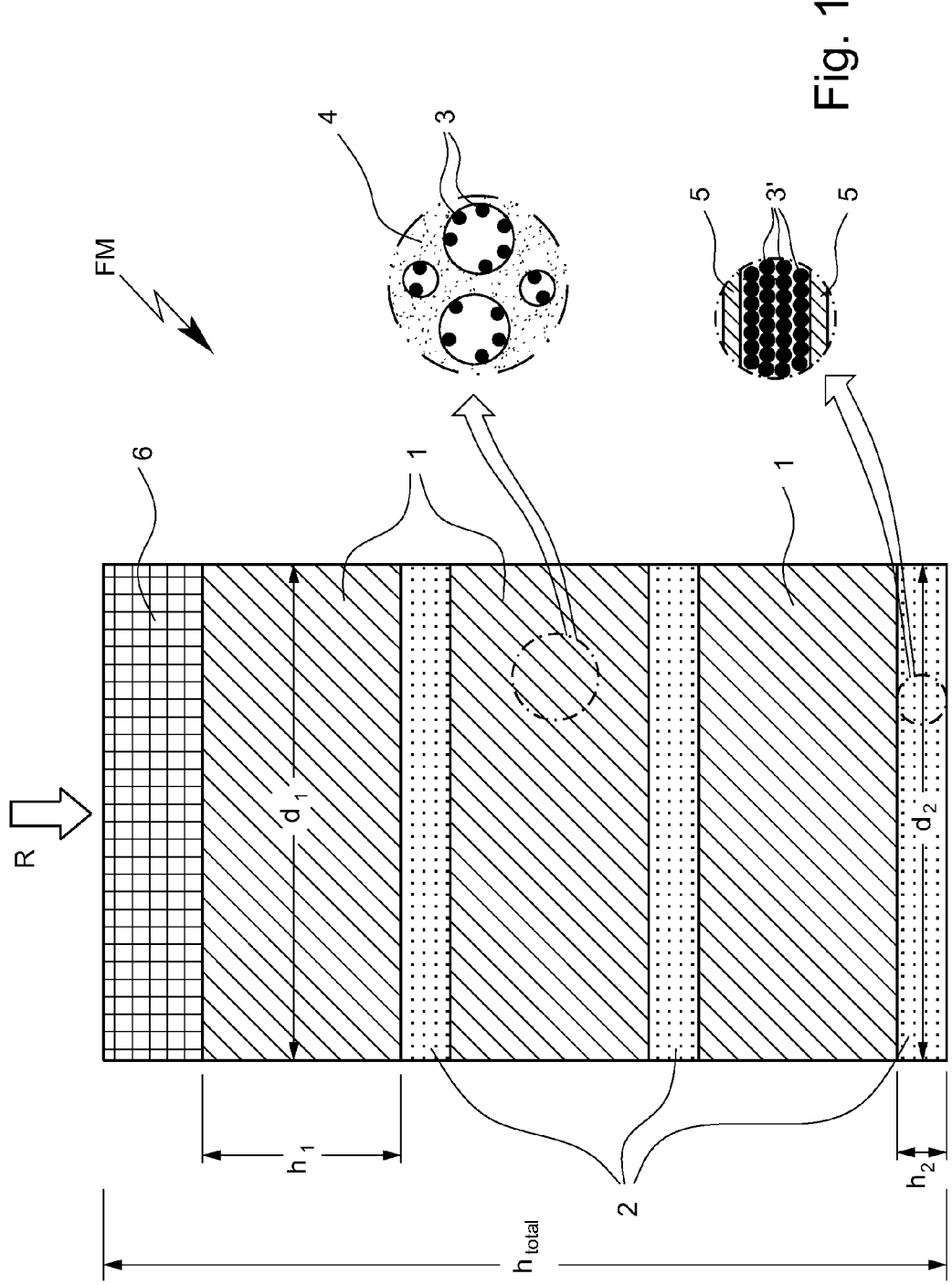

ADSORPTIVE FILTER MEDIUM

CROSS-REFERENCES TO RELATED APPLICATIONS

This application is a National Stage filing of International Application PCT/EP 2012/005385, filed Dec. 27, 2012, claiming priority to German Applications No. DE 10 2012 006 160.9 filed Mar. 28, 2012, and DE 10 2012 007 503.0 filed Apr. 17, 2012, entitled "ADSORPTIVE FILTER MEDIUM". The subject application claims priority to PCT/EP 2012/005385, and to German Applications No. DE 10 2012 006 160.9 and DE 2012 007 503.0 and incorporates all by reference herein, in their entirety.

BACKGROUND OF THE INVENTION

The present invention relates to the technical field of adsorptive materials and in particular to adsorptive filters which can be used, for example, to clarify fluids, such as gas/air streams.

More particularly, the present invention relates to an adsorptive filter medium based on a plurality of a first filter element and also on a plurality of a second filter element other than the first filter element, wherein the filter medium possesses an optimized adsorption behavior and/or optimized adsorption kinetics, particularly with regard to the breakthrough behavior of chemical and/or biological poison/noxiant materials, such as warfare agents.

The present invention further relates to methods of using the filter medium according to the invention for sorptive, in particular adsorptive, applications and/or for the removal of noxiants, specifically gaseous noxiants, or of gases or substances that are toxic, harmful and/or environmentally damaging.

The present invention also relates to filters and filter materials obtained using at least one filter medium of the present invention and/or comprising at least one filter medium of the present invention.

Fluids/fluidic media, more particularly gases, gas streams or gas mixtures, such as air for example, are often clarified or purified in the prior art using particulate systems based on particles possessing specific activity (e.g., adsorbents, ion exchangers, catalysts, etc). The prior art discloses for instance the use of adsorber particles to remove poisonous or noxiant agents and odors from gas or air streams, including in particular in the field of NBC protection.

The use of loose beds of the aforementioned particles, particularly in the form of loose granular-bed filters, is a significant use form to bring the particles concerned, such as adsorber particles for example, into contact with the fluid to be clarified.

Since small particles, such as adsorber particles for example, have a larger surface area in relation to their diameter than comparatively large particles, it is only to be expected that the performance is better with the comparatively small particles. However, small particles in a loose bed lead to a pressure drop that is high and not controllable as such, and also promote the formation of channels within the bed, causing a heightened risk of breakthrough with regard to the poisonous/noxiant agents to be adsorbed. This is why the particle size used in loose beds is often only a compromise, so the particle sizes that are actually optimal for a particular application can usually not be employed. More particularly, the need to achieve economical operating conditions, in particular an acceptable pressure drop, means that larger particles (e.g., adsorber particles) often come to be employed than would be desirable for optimal utilization of the adsorption efficiency and for an optimized breakthrough behavior—i.e., the time until the substances to be removed appear in a critical amount/concentration at the filter outlet—and so it is often the case that a considerable portion of the theoretically available capacity cannot be utilized.

In this context, DE 36 24 975 C2 describes a packed-bed filter based on a shaft which is packed with a granular bed and the side walls of which are pervious to the medium to be filtered, wherein a belt system moves/displaces the packed bed transversely to the direction of throughflow of the gas mixture to be clarified. The system described therein is disadvantageous in that it is cumbersome and hence unsuitable for compact filter systems and in that filter efficiency is not always optimal because of the packing used for the adsorption material.

It is further known in the prior art for the particles employed to remove odors and poisonous/noxiant agents from fluidic media, e.g., adsorber particles, to be secured/attached to a carrier in order thereby to reduce the resulting pressure drops of the filter system, especially compared with beds. However, in-service/on-stream time is occasionally shortened for filter systems of this type. More particularly, the breakthrough behavior with regard to the substances to be adsorbed/removed is problematic with filters of this type, which is extremely critical particularly in the case of highly toxic substances, such as chemical and/or biological poisons/noxiants, since even very small amounts of the substances in question have drastic consequences for the health/life of people confronted therewith. Prior art filters of this type, wherein the adsorption material is fixed to a carrier structure, do generally have a low flow(through) resistance, but, in the use state, the concentration profile within the filter of the noxiant/poisonous agents to be removed has a propensity due to dispersion effects in particular to excessively spread apart in the main flow direction of the fluid/gas mixture to be clarified, leading to a reduced breakthrough time and hence to inferior in-service/on-stream times for the filter.

DE 40 20 246 A1 discloses a device for adsorbing gases from an air stream and/or a carrier gas using an adsorbent bed suitable for fluidization, wherein the adsorbent particles employed therein are further additionally fixed to a downstream carrier in the manner of a fixed bed, the pressure drop of the fixed bed in the use state being stated to be low. The device described therein has an overall large volume due to the fluidization zone provided and occasionally has the disadvantage that particles fluidized in the use state may cause plugging of the fixed bed and that an optimal (initial) breakthrough behavior is not always ensured with regard to noxiant/poisonous agents in particular.

DE 38 13 564 A1 and the same patent family's EP 0 338 551 A2 disclose an activated carbon filter layer for NBC respirators which comprises a highly air-pervious, substantially shape-stable three-dimensional carrier scaffold whereto a layer of granular, specifically spherical activated carbon particles is fixed, wherein the carrier scaffold may be a braid formed of wires, monofilaments or struts, and/or a foam-based structure. However, the system described has not been optimized in particular with regard to a prolonged breakthrough behavior for substances/gases to be removed/adsorbed, such as biological and/or chemical noxiants/poisons.

DE 43 43 358 A1 further discloses porous bodies comprising activated carbon which consist of plates and agglomerates formed by ground activated carbon incorporated in a porous $SiO_2$ matrix. What is more particularly described therein are porous plates or bodies having adsorbing properties wherein activated carbon granules or activated carbon spherules and/ or particles comprising activated carbon are adhered together by means of a silicate solution and subsequently the silicate bridges are converted into silica gel bridges and the resultant bodies are dried. One disadvantage with this is the fixed geometry of these porous bodies and also their lack of flexibility and compressibility, making them unsuitable for filtering applications under mechanical loading. A further disadvantage is that the particles comprising activated carbon are completely wetted with the silicate solution, so a large proportion of the capacity of these particles is no longer available for adsorptive processes. The system described has further not been in any way optimized with regard to the breakthrough behavior of chemical/biological noxiants/poisons.

In conclusion, therefore, the filter systems known in the prior art do not always have good pressure drop properties nor optimal in-service/on-stream times, especially not with regard to the removal/adsorption of highly toxic substances from gas/air streams, so the systems known in the prior art are not always optimally suitable for an industrial-technical employment and/or for employment as a sheet filter and/or respiratory filter in the field of NBC protection in particular. The filter systems of the prior art often have a but minimal adsorption capacity, and the adsorption kinetics are also occasionally not optimal, so to compensate that in a corresponding manner occasionally requires large volumes/amounts of adsorbents, yet this leads to a further deterioration in the pressure drop properties and is also prejudicial to compact filter design/construction.

BRIEF SUMMARY OF THE INVENTION

Prior art systems based on loose beds are thus often associated, in the use state, with altogether high pressure drops and/or flow(through) resistances, and the filter structures provided in the prior art to avoid the above disadvantages, by having adsorptive particles/adsorbents secured/fixed on carrier materials, have the disadvantage that the adsorption capacity is reduced for an increased overall volume and, furthermore, that the adsorption behavior is occasionally not improved compared with bed systems, particularly with regard to the breakthrough behavior of noxiants to be removed/adsorbed.

The occasionally insufficient adsorption capacity leads to rapid exhaustion of the filter system under in-service conditions, so the filter materials of the prior art have to be frequently exchanged as part of their use. Moreover, the adsorption kinetics/"spontaneity" of prior art adsorption filter units are not always sufficient, so undesirable breakthroughs can often occur in the use scenario after a very short in-service time.

Therefore, there is altogether an immense need in relation to the removal/adsorption of fluids, in particular based on gaseous toxic substances, such as biological and/or chemical noxiants/poisons, for the provision of high-performance filter systems which not only have a volume/geometric shape that is optimized to the particular purpose in particular but also have an improved adsorption behavior based on a prolonged breakthrough behavior for the substances to be adsorbed in order that harmful/disruptive noxiant, poisonous or odorant agents may be removed from gas streams and/or air at high efficiency.

Against this background, therefore, the problem addressed by the present invention is that of providing adsorptive systems based on an adsorptive filter medium which are capable of at least substantially avoiding or else at least ameliorating the above-described disadvantages of the prior art.

One particular problem addressed by the present invention is that of providing adsorptive filter media that have an improved efficiency with regard to the removal/adsorption of toxic substances, in particular in the form of biological/chemical poisons/noxiants, in that in particular the (initial) breakthrough behavior in relation to the substances to be removed shall be improved in order for a prolongated in-service/on-stream time to be made possible in this way. More particularly, the filter systems of the present invention which are based on an adsorptive filter medium shall also have overall a low pressure drop and/or low flow(through) resistances under use conditions, so suitability for filtering applications, for example in the context of industrial/technical applications, but also in the field of NBC protection, shall be high.

The problem as defined above is solved according to the present invention by the subject matter disclosed herein, which relates to the adsorptive filter system (interchangeably also called filter unit and/or filter structure) which is in accordance with the present invention and which comprises a plurality of a first filter element (hereinafter equally referred to with the designation F1 and/or interchangeably with the reference sign 1) and a plurality of a second filter element (hereinafter equally referred to with the designation F2 and/or interchangeably with the reference sign 2) other than the first filter element F1; further, advantageous developments and elaborations of this aspect of the present invention are similarly disclosed.

The present invention further provides methods of using the filter medium of the present invention in the manner of the present invention that are also disclosed.

The present invention further provides filters and filter materials obtained using the filter medium of the present invention and/or comprising the filter medium of the present invention.

It will be readily understood that elaborations, embodiments, advantages and the like as recited hereinbelow in respect of only one aspect of the present invention for the avoidance of repetition, self-evidently also apply mutatis mutandis to the other aspects of the present invention.

It will further be readily understood that the values/ranges recited for the value, number and range citations hereinbelow are not to be construed as limiting; a person skilled in the art will appreciate that in a particular case or for particular use departure from the recited ranges and particulars is possible without leaving the realm of the present invention.

It shall further be the case that all value/parameter particulars or the like mentioned below can in principle be determined using standard or explicitly indicated methods of determination or alternatively using methods of determination with which a person skilled in the art is familiar per se.

Having made that clear, the present invention will now be more particularly described.

BRIEF DESCRIPTION OF THE DRAWINGS

FIG. 1 shows a schematic sectional depiction of the inventive filter medium FM along the main flowthrough direction R with the fluid, especially gas/gas mixture, to be clarified, wherein the filter medium FM comprises an alternating sequence between a first filter element F1 and a second filter element F2; detail magnifications of filter elements F1, F2 are also indicated in each case; the filter medium FM in this embodiment further comprises a particle/aerosol filter layer placed directly upstream in the main flowthrough direction R;

DETAILED DESCRIPTION OF THE INVENTION

Figure 2A:
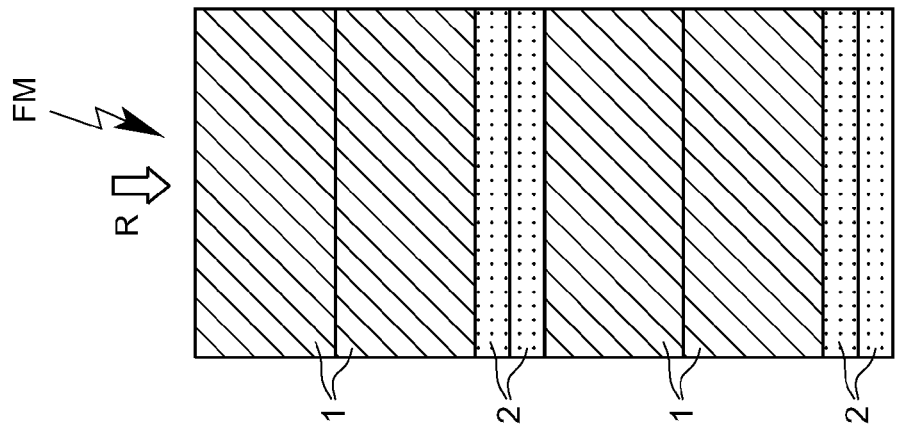
FIGS. 2A to 2C show schematic sectional depictions through inventive filter media FM along the main flowthrough direction R with varying numbers and dispositions for the particular first filter elements F1 and the particular second filter elements F2.

The present invention accordingly provides—in a first aspect of the present invention—an adsorptive filter medium, particularly for clarification of gases and/or gas mixtures, preferably air, and/or particularly for removal of chemical and/or biological poisons and/or noxiants from gases and/or gas mixtures, preferably air, wherein the filter medium comprises
    a plurality of a first filter element F1 having a first adsorption material, particularly in the form of adsorbent particles, and
    a plurality of a second filter element F2 which is other than the first filter element F1 and has a second adsorption material, in particular in the form of adsorbent particles,
wherein the first filter element F1 and the second filter element F2 have mutually different pressure drops and/or mutually different flow(through) resistances.

The fundamental concept of the present invention is accordingly that of providing an adsorptive filter medium that includes individual/discrete filter elements F1 and F2 which have different properties with regard to the particular pressure drop and/or flow(through) resistance. In the invention, the particular filter elements F1 and F2 are disposed within the adsorptive filter medium of the invention in a hereinbelow further elaborated manner such that, as the fluid to be clarified flows through the filter medium, the particular filter elements F1 and F2 form regions differing in pressure drop and/or flow(through) resistance in the filter medium along the main flow through direction of the filter medium. Different densities for materials and/or loading occupancy, as detailed hereinbelow, of the particular filter elements F1 and F2 may be used to predetermine/adjust the different properties of the particular filter elements F1 and F2 for example. In effect, the present invention makes it possible to provide/predetermine somewhat leaplike or gradual density differences along the main flow direction in the filter medium.

According to the present invention, regions of high pressure drop and/or high flow(through) resistance on the one hand and regions of low pressure drop and/or low flow (through) resistance are thus present in the adsorptive filter medium of the present invention, while the configuration/coordination for this can be individually adjusted/custom tailored according to the present invention with regard to the nature/properties of the substances to be adsorbed/removed particularly against the background of the planned purpose of use, by the intentional disposition and configuration of the particular filter elements F1 and F2 within the filter medium of the present invention.

It is therefore the case that, according to the present invention, low flow(through) resistance regions on the one hand and higher flow(through) resistance regions on the other are present in the filter medium of the present invention that are based in particular respectively on filtration layers that are highly pervious for the fluid and highly efficient filtration layers. This is because, as will be further detailed hereinbelow, the filter elements are disposed in the manner of the present invention such that those filter elements of lower pressure drop/flow(through) resistance, as formed for example by filter elements of low density and/or low adsorbent loading, are disposed in the main flow direction before such filter elements of higher pressure drop/flow(through) resistance, as formed for example by filter elements of high density and/or adsorbent loading, and thus upstream of the filter elements of high pressure drop/flow(through) resistance. The disposition of the particular filter elements which is preferred according to the present invention leads overall to a relatively long contact time for the substances to be removed/adsorbed, especially in the region of lower pressure drop/flow(through) resistance.

The concept of the present invention leads in an utterly surprising manner to an improved filtering efficiency and significant prolongation of breakthrough times for the substances to be removed/adsorbed, so the concept of the present invention is the basis for providing in total an extremely high-performing filter medium which is suitable also and in particular for removing occasionally highly toxic substances, for example biological/chemical poisons/noxiants. This is another reason why the adsorptive filter medium of the present invention is suitable not only for industrial/technical applications, but in particular also for deployment in the context of NBC protection, particularly with regard to employment as a gas filter for NBC respirators or the like.

The specific construction of the filter medium according to the present invention further ensures that the pressure drop/flow(through) resistance of the filter medium as a whole is in an optimized state wherein the system in its entirety, i.e., based on the filter medium as such or overall, achieves relatively low pressure drops which correspond to those of customary carriered systems, which similarly improves the performance characteristics in a significant manner, particularly with regard to high volume-specific throughputs for fluids to be clarified in industrial applications and an improved wearing comfort through a low level of respiratory resistance on deploying the filter media of the present invention in or as filters for, for example, NBC respirators or the like.

The use of high-efficiency filter elements further provides for compactness in the design of the resulting filter media according to the invention.

In addition, the concept of the present invention is the foundation for uniformizing variations in the concentration of (noxiant) substances to be removed/adsorbed, along the particular cross sections through the filter elements used as a result—without wishing to be tied to this theory—of improving/encouraging the movement of the fluid/gases and/or the gas mixture, in particular of the air to be clarified, even transversely to the main direction of flow through the filter medium of the present invention, which equally leads to an improvement in the adsorption efficiency and the breakthrough behavior.

According to the present invention, the specific construction of the filter medium according to the present invention compensates so-called dispersion effects, which leads to a further improvement of the filtering properties.

The present invention thus achieves a first in providing an adsorptive filter medium which, by virtue of the specific selection and disposition of filtering elements which form the filter medium of the present invention and which each have different properties with regard to the respective pressure drops/flow(through) resistances, exhibits an improved actualization of the filtration/adsorption potential as a whole in that this approaches the theoretical maximum filtration performance of the adsorption materials used. The utterly surprisingly resulting improved actualization of the adsorption capacity of the filter medium according to the present invention leads in effect to a prolongation of the useful life of the filter medium according to the invention. In fact, by omitting/eschewing occasionally superfluous filtering material it is even possible in this regard to achieve a further decrease/reduction in the (overall) pressure drop of the filter medium according to the invention.

The particular pressure drops/flow(through) resistances of the deployed filter elements F1 and F2 may be predetermined by the intentional selection of the constitution of the particular filter elements F1 and F2, as will be further detailed hereinbelow. More particularly, the material-related properties/parameters of the components forming the particular filter elements F1 and F2 may be selected with a view to predetermined pressure drops/flow(through) resistances, for example as far as the deployed carrier materials and adsorbents are concerned. The above particulars are not in any way restricting, and a person skilled in the art is at all times able to engineer the particular filter elements F1 and F2, especially on the basis of the materials/components used therefor, such that the desired pressure drops and/or flow(through) resistances are obtained.

The adsorptive filter medium of the present invention thus in effect combines an improved level of adsorption performance—particularly with regard to prolongated breakthrough times—and also optimized pressure drops/flow(through) resistances—particularly versus granular bed systems—in one and the same material, leading in effect to a high-performance filter medium having improved properties which is more particularly capable of meeting even the applicable ABEK requirements (cf. DIN EN 14387).

In other words, the present invention equally provides an adsorptive filter medium, particularly for clarification of gases and/or gas mixtures, preferably air, and/or particularly for removal of chemical and/or biological poisons and/or noxiants from gases and/or gas mixtures, preferably air, wherein the filter medium comprises a plurality of a first filter element F1 having a first adsorption material, in particular in the form of adsorbent particles, and a plurality of a second filter element F2 which is other than the first filter element F1 and has a second adsorption material, in particular in the form of adsorbent particles. It may here be provided in particular that the first filter element F1 and the second filter element F2 have mutually different properties and/or parameters such that the first filter element F1 has a lower pressure drop and/or a lower flow(through) resistance than the second filter element F2, or such that the second filter element F2 has a higher pressure drop and/or a higher flow(through) resistance than the first filter element F1.

It may further be provided according to the present invention that the particular first filter elements F1 have mutually different pressure drops/flow(through) resistances, yet with the proviso that these are each lower than those of the particular second filter elements F2. The corresponding condition holds for the second filter elements F2 in that these may have mutually different pressure drops and/or mutually different flow(through) resistances, yet with the proviso that these are each greater than those of the particular first filter elements F1.

The present invention equally also relates to an adsorptive filter medium, particularly for clarification of gases and/or gas mixtures, preferably air, and/or particularly for removal of chemical and/or biological poisons and/or noxiants from gases and/or gas mixtures, preferably air, wherein the filter medium comprises a plurality of a first filter element F1 having a first adsorption material, in particular in the form of adsorbent particles, and a plurality of a second filter element F2 which is other than the first filter element F1 and has a second adsorption material, in particular in the form of adsorbent particles, wherein the first filter element F1 has a lower pressure drop and/or a lower flow(through) resistance than the second filter element F2, and/or wherein the second filter element F2 has a higher pressure drop and/or a higher flow(through) resistance than the first filter element F1.

The present invention further equally relates to an adsorptive filter medium, particularly for clarification of gases and/or gas mixtures, preferably air, and/or particularly for removal of chemical and/or biological poisons and/or noxiants from gases and/or gas mixtures, preferably air, wherein the filter medium comprises a plurality of a first filter element F1 having a first adsorption material, in particular in the form of adsorbent particles, and a plurality of a second filter element F2 which is other than the first filter element F1 and has a second adsorption material, in particular in the form of adsorbent particles, wherein the first filter element F1 and the second filter element F2 have mutually different properties and/or mutually different parameters, wherein the property and/or the parameter is selected from the group of (material-related) density of filter elements F1 and F2, loading density of filter elements F1 and F2, in particular loading density with the adsorption material, pressure drop and/or flow(through) resistance, in particular with the proviso that the first filter element has the smaller values with regard to the aforementioned properties and/or parameters compared with the second filter element F2.

The term "adsorptive filter medium", as used in the context of the present invention and as used interchangeably with adsorptive filter unit and/or adsorptive filter structure, is to be understood as having a very broad meaning, and relates particularly to a preferably stack-shaped disposition and/or a sequence based on individual filter elements to form the filter medium of the present invention. It may here be provided in the context of the present invention that the particular filter elements stack atop each other loosely, so to speak. It is equally possible in the context of the present invention for the particular filter elements to be in the state where they are bonded/fixed to each other, for example via an appropriate binder and/or by using an adhesive, for example on the basis of a hot-melt adhesive, in which case the bonding between the particular filter elements may take place in the form, for example, of a dot-shaped application of adhesive or on the basis of a specifically random/orderless fibrous braid of the binder/adhesive used.

The terms "pressure drop" and "flow(through) resistance" as used in the context of the present invention are further to be understood synonymously and more particularly describe the physical properties of the filter medium according to the present invention with regard to the passage therethrough of the fluid to be clarified, in particular in its use state. More particularly, the terms in question relate to the corresponding properties of the filter medium according to the present invention which result on a fluid, in particular gases or gas mixtures, preferably air, flowing/passing through the filter element of the present invention. The particular methods of determining the parameters/properties in question are well known as such to a person skilled in the art. More particularly, the pressure drop/flow(through) resistance can be determined in accordance with and/or along the lines of the DIN EN 14387 standard, in particular at a superficial flow velocity of 6.4 cm/s. In principle, however, other methods of determination are also suitable for determining the said parameters of pressure drop/flow(through) resistance.

It may be provided according to the present invention that the filter medium of the present invention comprises at least two, in particular at least three, preferably four or more, first filter elements F1. It may equally be provided according to the present invention that the filter medium of the present invention comprises at least two, in particular at least three, preferably four or more, second filter elements F2. It is accordingly provided in a preferred embodiment of the present invention that the filter medium of the present invention comprises a multiplicity of filter elements F1 and F2 wherein the particular numbers of filter elements F1 and F2 may each be independently selected and/or coordinated with each other, particularly against the background of the particular purpose and/or objective of the planned use.

With regard to the disposition/positioning of the particular filter elements F1 and/or F2 within the filter medium according to the present invention, it may be provided according to the present invention that at least one first filter element F1 is disposed upstream of at least one second filter element F2. In other words, it may be provided according to the present invention that at least one second filter element F2 is disposed downstream of at least one first filter element F1. The scenario with the present invention is accordingly in particular such that, based on the in-use state of the filter medium according to the present invention, at least one first filter element F1 particularly of low pressure drop and/or flow(through) resistance is provided as the element which comes first and thus faces the fluid to be clarified and is positioned at the filter inlet so to speak, while at least one second filter element F2 particularly of high pressure drop and/or flow(through) resistance is preferably disposed on that side of the filter medium according to the present invention which faces away from the fluid to be clarified and thus at the filter outlet so to speak.

The term "upstream" as used in the present invention relates in this context particularly to a relative disposition of a deployed filter element in relation to at least one further filter element within the filter medium of the present invention wherein the filter element is disposed in relation to the further filter elements such that said filter element is disposed in its in-use state, compared with the further filter elements, contrary to the main flow direction of the fluid to the further filter elements and thus so to speak ahead of the further filter elements. An analogous scenario applies in relation to the term "downstream" used in the present invention, such that a filter element used for the filter medium of the present invention is disposed in relation to at least one further filter element used for the filter medium of the present invention behind the further filter element in the main flow direction of the fluid.

The scenario with the present invention is more particularly such that at least one filter element F1, F2 of lower pressure drop and/or lower flow(through) resistance is disposed upstream of at least one further filter element F1, F2 of higher pressure drop and/or higher flow(through) resistance compared with the upstream filter element F1, F2.

The specific disposition of the filter elements F1 and F2 relative to each other, whereby at least one filter element having a pressure drop higher than the preceding filter element is disposed downstream of the preceding filter element having the logically lower pressure drop than the subsequent filter element provides an utterly surprising improvement in the adsorption behavior of the filter medium according to the present invention by a significant margin, particularly with regard to a prolongation of the breakthrough time for substances to be removed/adsorbed, such as biological and/or chemical noxiant/poison materials. Without wishing to be tied to this theory, the goal-directed positioning of at least one filter element of higher pressure drop downstream of at least one filter element of lower pressure drop lengthens the time which the fluid to be clarified is resident in the filter medium as a whole and also reduces concentration variations/differences along the particular filter cross section for noxiant/poison materials to be removed/adsorbed, by enhancing the movement of fluid even transversely to the main flow direction, thereby improving the filtering efficiency overall and the breakthrough behavior in particular in a manner which is utterly surprising.

What has proved advantageous in the context of the present invention in this context in particular is for the filter medium of the present invention to be bounded in the upstream direction by at least one first filter element F1. It is equally advantageous for the purposes of the present invention for it to be at least one first filter element F1 which is disposed in the downstream direction as the filter element which is positioned in the first place.

It is equally advantageous in this connection for the filter medium of the present invention to be bounded in the upstream direction by at least one filter element F1, F2, in particular by a first filter element F1, of lower pressure drop and/or lower flow(through) resistance. It may in particular be provided according to the present invention that it is at least one filter element F1, F2, in particular the first filter element F1, of lower pressure drop and/or lower flow(through) resistance which is disposed in the downstream direction as the filter element F1, F2 which is positioned in the first place.

The scenario of the present invention in this context is in particular such that the filter element F1, F2, in particular the filter element F1, of lower pressure drop and/or lower flow (through) resistance has a low pressure drop and/or lower flow(through) resistance than the high pressure drop and/or flow(through) resistance filter element F1, F2, in particular the filter element F2 bounding the filter medium of the present invention in the downstream direction and/or positioned last in the downstream direction.

It is further of particular advantage for the filter element F1, F2 which is positioned in the first place in the downstream direction, in particular the first filter element F1 which is positioned in the first place, to have a lower pressure drop/flow(through) resistance than the subsequent filter elements F1, F2 (i.e., the filter elements F1, F2 disposed downstream of the filter element which is positioned in the first place). The filter element F1, F2 positioned in the first place in the downstream direction may more particularly have the lowest pressure drop/flow(through) resistance of all the filter elements F1, F2 used for the filter medium of the present invention.

In a further embodiment which is in accordance with the present invention, however, it may also be provided that at least one additional filter element F1, F2 of higher pressure drop and/or higher flow(through) resistance, in particular at least one additional second filter element F2, precedes the subsequent filter elements F1, F2 on the upstream side and/or forms the filter element F1, F2 which is disposed in the first place in the main flowthrough direction. This disposition is able—without wishing to be tied to this theory—to effect a certain additional uniformization of the flow behavior of the fluid, particularly the gas or gas mixture, flowing into the filter medium of the present invention and thereby a still further enhancement of filtering efficiency. In this disposition, the optionally preceding filter element F1, F2, in particular the second filter element F2, should have a higher pressure drop and/or a higher flow(through) resistance than the subsequent filter elements F1, F2 having the lower pressure drop/flow (through) resistance, in particular than the second filter elements F2.

In a further embodiment which is in accordance with the present invention, it may additionally be provided that the filter medium of the present invention is bounded in the downstream direction by at least one second filter element F2 and/or that it is a second filter element F2 which is disposed/positioned in the downstream direction as the filter element F1, F2 which is positioned in the last place.

More particularly, the filter medium of the present invention is bounded in the downstream direction by at least one filter element F1, F2 of higher pressure drop and/or higher flow(through) resistance, and/or it is at least one filter element F1, F2 of higher pressure drop and/or flow(through) resistance which is disposed in the downstream direction as the filter element F1, F2 which is positioned in the last place.

The scenario with the present invention is in this respect in particular such that the filter element F1, F2, in particular the filter element F2, having the higher pressure drop/flow (through) resistance has a higher pressure drop/flow(through) resistance than a low pressure drop and/or flow(through) resistance filter element F1, F2, in particular than the filter element F2, which bounds the filter medium of the present invention in the upstream direction and/or is positioned in the first place in the downstream direction.

It is further advantageous according to the invention for the filter element F1, F2 which is positioned in the last place in the downstream direction, in particular the second filter element F2 which is positioned in the last place, to have a higher pressure drop and/or a higher flow(through) resistance than the preceding/previous filter elements F1, F2 (i.e., the filter elements F1, F2 disposed upstream of the filter element which is positioned in the last place). The filter element F1, F2 positioned in the last place in the downstream direction may in particular have the highest pressure drop/flow(through) resistance of all of the filter elements F1, F2 used for the filter medium of the present invention.

The filter medium of the present invention may additionally be configured such that the first filter elements F1 and the second filter elements F2 are disposed in stack form and/or stacked atop each other. As mentioned above, the filter elements F1, F2 in question may be stacked atop each other loosely or else be interbonded, in particular adhered, for example by using a (hot-melt) glue applied in dot form and/or in a mesh-type manner, and/or a (hot-melt) glue mesh.

As regards in addition the further possible ways of disposing the particular filter elements F1, F2 within the filter medium of the present invention, these can vary within wide limits:

It may thus be provided for the purposes of the present invention that the first filter elements F1 and the second filter elements F2 are disposed alternatingly/mutually alternately/periodically.

It may further be provided for the purposes of the present invention that the first filter elements F1 are disposed blockwise/in the form of at least one block B1. In this context, the block B1 of the first filter elements F1 may comprise at least two, preferably three or more, first filter elements F1. More particularly, two or more first filter elements F1, in particular at least two, preferably three or more, first filter elements F1 may be stacked atop each other/disposed in direct succession to each other.

In a further embodiment which is in accordance with the present invention, it may additionally be provided that the second filter elements F2 are also disposed blockwise/in the form of at least one block B2. In this context, the block B2 of second filter elements F2 may comprise at least two, preferably three or more, second filter elements F2. More particularly, two or more second filter elements F2, in particular at least two, preferably three or more, second filter elements F2 may be stacked atop each other/disposed in direct succession to each other in the filter medium of the present invention.

In this context, it is within the realm of the present invention for the first filter elements F1/the second filter elements F2 each to be disposed alternatingly blockwise/mutually blockwise, and/or periodically blockwise.

It is additionally also of advantage for the purposes of the present invention for the filter medium of the present invention to be bounded in the upstream direction by at least one block B1 of the first filter elements F1. In this respect, the block B1 should comprise at least two, preferably three or more, first filter elements F1. It may more particularly be provided for the purposes of the present invention that it is at least one block B1 of first filter elements F1 which is disposed as the block which is positioned in the first place. In this context, the block B1 should comprise at least two, preferably three or more, first filter elements F1.

The filter medium of the present invention may further be bounded in the downstream direction by at least one block B2 of second filter elements F2. In this respect, the block B2 should comprise at least two, preferably three or more, second filter elements F2. More particularly, it should be at least one block of second filter elements F2 which is disposed in the downstream direction as the block which is positioned in the last place. In this context, the block B2 should comprise at least two, preferably three or more, second filter elements F2.

More particularly, the block B1 which is based on the first filter elements F1 thus comprises filter elements F1 having lower pressure drops/lower flow(through) resistances than the filter elements F2 forming the further block B2.

Correspondingly, the block B which is based on the second filter elements F2 thus comprises in particular filter elements F2 having higher pressure drops/higher flow(through) resistances than the filter elements F1 forming the further block.

In addition to the number and disposition of the particular filter elements F1, F2 in the filter medium of the present invention, the shape or physical form of the underlying filter elements F1 and F2 also plays a significant part:

Thus, the first filter element F1/the second filter element F2/the resulting filter medium of the present invention may be box shaped/cuboid shaped/cylinder shaped, while a cylinder-shaped form is preferred for the purposes of the present invention.

According to the present invention, the first filter element F1 and the second filter element F2 should each have two at least essentially parallel/at least essentially planar/level interfaces/main extension planes. What the present invention may provide in this regard is that the filter elements F1, F2 are disposed/stacked such that pairs of facing interfaces/main extension planes (main extension faces) touch, in particular lie atop/appose each other at least essentially full-facially. More particularly, the filter elements F1, F2 are thus disposed such that these lie atop each other with the mutually area/size-equal faces. This makes for particularly good stacking of the filter elements F1, F2 within the filter medium of the present invention in that stability is appropriately high while irregular and/or comparatively large voids prejudicial to adsorption capacity are avoided between the particular filter elements F1, F2.

The present invention may provide in particular that the first filter element F1 and/or the second filter element F2, in particular the first filter element F1 and the second filter element F2, are disposed with their respective at least essentially planar and/or level interfaces and/or with their respective main extension planes at least essentially perpendicularly to the main flowthrough direction of the filter medium.

It may further be provided according to the present invention that the first filter element F1 and the second filter element F2 have at least essentially identical breadths and/or depths and/or at least essentially identical diameters, based on the extent transversely/perpendicularly to the main flowthrough direction in the use state (width/depth refers in this context to a specifically rectangular basal area/main extension plane of filter elements F1, F2, while diameter relates to a specifically circular basal area/main extension plane). In other words, breadth/depth and also diameter for the particular filter elements relates to the extension of the respective filter elements F1, F2 transversely/perpendicularly to the main flowthrough direction of the filter medium.

It has additionally proved advantageous for the purposes of the present invention for the height h1 of the first filter element F1 to be greater than the height h2 of the second filter element F2, based on the extent of the respective elements parallel to the main flowthrough direction. Said heights h1 and h2 thus relate in particular to the extent of filter elements F1, F2 parallel to the main flowthrough direction of the filter medium according to the present invention.

What the present invention may provide in this context is that the height h1 of the first filter element F1 exceeds by a factor in the range from 1.1 to 500, in particular from 1.3 to 200, preferably from 1.5 to 100, more preferably from 1.8 to 75 and yet more preferably from 2 to 50 the height h2 of the second filter element F2. It may equally be provided according to the present invention that the height h1 of the first filter element F1 exceeds by a factor of at least 1.1, in particular at least 1.3, preferably at least 1.5, more preferably at least 1.8, and even more preferably at least 2, the height h2 of the second filter element F2, based on the extent parallel to the main flowthrough direction.

What the present invention may provide in particular is that the ratio of the height h1 of the first filter element F1 to the height h2 of the second filter element F2 [the h1:h2 ratio] is in the range from 800:1 to 1.05:1, in particular from 600:1 to 1.1:1, preferably from 300:1 to 1.5:1, more preferably from 100:1 to 1.8:1, yet more preferably from 50:1 to 2:1 and most preferably from 20:1 to 2:1, based on the extent parallel to the main flowthrough direction.

It may equally be provided according to the present invention that die particular filter elements F1 as such have mutually different sizes/dimensions, in particular as far as the heights h2 of the particular first filter elements F1 are concerned. In this regard, however, the corresponding heights h1 of the particular filter elements F1 should be greater than those of the second filter elements F2. This holds correspondingly for filter elements F2, where it may be equally provided that the particular second filter elements F2 have mutually different sizes/dimensions, in particular heights h2, in particular with the proviso that the particular heights h2 of the second filter elements F2 are less than the heights h1 of the first filter elements F1.

The sizes/dimensions of the particular filter elements F1 and F2 may in general further vary between wide limits: the first filter elements F1 may each independently have heights h1 in the range from 1 to 1000 mm, in particular from 5 to 500 mm, preferably from 7.5 to 250 mm, more preferably from 10 to 200 mm and yet more preferably from 15 to 150 mm.

The second filter elements F2 may each independently have heights h2 in the range from 0.5 mm, to 100 mm, in particular from 0.75 mm to 75 mm, preferably from 1 to 50 mm, more preferably from 1.5 mm to 25 mm and even more preferably from 2 mm to 10 mm. More particularly, the second filter elements F2 may be configured as flat filter media.

In addition, the filter elements F1, F2 may each have diameters d1, d2 or edge lengths (i.e., breadths and/or depths) in the range from 1 mm to 150 mm, in particular from 2 mm to 100 mm, preferably from 3 mm to 75 mm and more preferably from 5 mm to 25 mm.

The particular pressure drop/flow(through) resistance, of filter elements F1, F2 may be adjusted/predetermined in a nonlimiting manner via the (material-related) density of the filter elements:

with regard to the filter medium of the present invention, it is preferable for the present invention when the (material related) density D1 of the first filter element F1 is less/lower than the (material-related) density D2 of the second filter element F2. In other words, it is preferable for the present invention for the density D2 of the second filter element F2 to be greater than the density D1 of the first filter element F1. Density relates in particular to the corresponding filter element F1, F2 as such in that it may comprise, for example, a carrier to which the adsorption material is secured/fixed with a fixative/adhesive. A higher density in this context leads in the realm of the concept of the present invention, as mentioned above, to a higher pressure drop/flow(through) resistance for the filter element F1, F2 in question, whereas a lower density leads in a corresponding manner to a lower pressure drop/flow(through) resistance for the underlying filter element F1, F2.

The present invention may provide in this context that the density D2 of the second filter element F2 exceeds by a factor in the range from 1.01 to 50, in particular from 1.05 to 40, preferably from 1.075 to 50, more preferably from 1.1 to 25, yet more preferably from 1.15 to 20 the density D1 of the first filter element F1. The density D2 of the second filter element F2 may equally exceed by a factor of at least 1.01, in particular at least 1.05, preferably at least 1.075, more preferably at least 1.1 and even more preferably at least 1.15 the density D1 of the first filter element F1. The density D2 of the second filter element F2 may more particularly be at least 1%, in particular at least 2.5%, preferably at least 5%, more preferably at least 10%, yet more preferably at least 20% and most preferably at least 25% greater than the density D1 of the first filter element F1, based on the density D1 of the first filter element F1.

It may additionally be provided according to the present invention that the ratio of the density D2 of the second filter element F2 to the density D1 of the first filter element F1 [the D2:D1 ratio] is in the range from 10:1 to 1.05:1, in particular from 8:1 to 1.1:1, preferably from 6:1 to 1.15:1, more preferably from 5:1 to 1.2:1, yet more preferably from 3:1 to 1.3:1 and most preferably from 2:1 to 1.5:1.

The first filter element F1 may have a density D1 in the range from 50 kg/m$^3$ to 800 kg/m$^3$, in particular from 100 kg/m$^3$ to 600 kg/m$^3$, preferably from 150 kg/m$^3$ to 500 kg/m$^3$, more preferably from 200 kg/m$^3$ to 450 kg/m$^3$ and yet more preferably from 250 kg/m$^3$ to 350 kg/m$^3$, in particular with the proviso that the density D1 of the first filter element F1 is less than the density D2 of the second filter element F2.

The second filter element F2 may further have a density D2 in the range from 100 kg/m$^3$ to 1250 kg/m$^3$, in particular from 150 kg/m$^3$ to 1000 kg/m$^3$, preferably from 200 kg/m$^3$ to 800 kg/m$^3$, more preferably from 250 kg/m$^3$ to 600 kg/m$^3$, yet more preferably from 350 kg/m$^3$ to 500 kg/m$^3$ and most preferably from 375 kg/m$^3$ to 450 kg/m$^3$, in particular with the proviso that the density D2 of the second filter element F2 is greater than the density D1 of the first filter element F1.

The present invention thus provides in particular that the first filter element F1 has a lower density D1 and/or—as predicated by the lower density in particular—a lower pressure drop and/or a lower flow(through) resistance than the second filter element F2 and/or that the second filter element F2 has a greater density D2 and/or—as predicated by the higher density in particular—a greater pressure drop and/or a greater flow(through) resistance than the first filter element F1.

The pressure drop and/or flow(through) resistance of the second filter element F2 should exceed by a factor in the range from 1.5 to 300, in particular from 2 to 250, preferably from 3 to 200, more preferably from 4 to 150 and yet more preferably from 5 to 100 the pressure drop and/or flow(through) resistance of the first filter element F1. In addition, the pressure drop and/or flow(through) resistance of the second filter element F2 should exceed by a factor of at least 1.5, in particular at least 2, preferably at least 3, more preferably at least 4 and yet more preferably at least 5 the pressure drop and/or flow(through) resistance of the first filter element F1.

More particularly, the ratio of the pressure drop and/or flow(through) resistance of the second filter element F2 to the pressure drop and/or flow(through) resistance of the first filter element F1 should be in the range from 500:1 to 1.5:1, in particular from 400:1 to 1.75:1, preferably from 300:1 to 2:1, more preferably from 200:1 to 3:1, yet more preferably from 150:1 to 4:1 and most preferably from 100:1 to 5:1.

It may additionally be provided for the purposes of the present invention that the first filter element F1 has a pressure drop and/or flow(through) resistance in the range from 0.1 Pa/cm to 100 Pa/cm, in particular from 0.25 Pa/cm to 75 Pa/cm, preferably from 0.5 Pa/cm to 50 Pa/cm, more preferably from 0.75 Pa/cm to 30 Pa/cm and yet more preferably from 1 Pa/cm to 25 Pa/cm, in particular with the proviso that the pressure drop and/or flow(through) resistance of the first filter element F1 is smaller than the pressure drop and/or flow(through) resistance of the second filter element F2.

The present invention may provide in particular that the second filter element F2 has a pressure drop and/or flow (through) resistance in the range from 1 Pa/cm to 250 Pa/cm, in particular from 2 Pa/cm to 200 Pa/cm, preferably from 3 Pa/cm to 150 Pa/cm, more preferably from 5 Pa/cm to 125 Pa/cm and yet more preferably from 10 Pa/cm to 100 Pa/cm, in particular with the proviso that the pressure drop and/or flow(through) resistance of the second filter element F2 is greater than the pressure drop and/or flow(through) resistance of the first filter element F1.

As mentioned above, the pressure drop/flow(through) resistance of the filter elements F1, F2 in question and/or of the filter medium according to the present invention may be determined in accordance with DIN EN 14387, in particular at a flow velocity, in particular at a superficial flow velocity, of 6.4 cm/sec.

The particular pressure drops/flowthrough resistances may, as mentioned above, be adjusted via the particular densities D1, D2 of the respective filter elements F1, F2, in which case the densities as such may be adjusted in a nonlimiting manner via the choice of carrier, the loading amount of filter elements F1, F2 with the particular adsorption material and also the size of the particular particles of the adsorption material used—as is known as such to a person skilled in the art. For example, a high loading amount of the corresponding carrier material, in particular of the second carrier material F2, with the adsorbents leads to a higher density D2 and hence to a higher pressure drop/flow(through) resistance for the filter element F2 thus loaded. In addition, the pressure drop/flow(through) resistance may be increased by using small particles (particle diameters) for the adsorbents in a loading amount which is high in particular in that this leads to a further increase in the packing density and hence to the envisaged increase in the pressure drop/flow(through) resistance.

Correspondingly, lower loading amounts and/or greater particles (particle diameters) may be used for the first adsorption material/the absorbents for the first filter element F1 in order that lower pressure drops/flow(through) resistances may thereby be obtained for the first filter element F1. Again, this is known as such to a person skilled in the art, so a person skilled in the art is at all times able to select/coordinate the particular measures such that the recited pressure drops/flowthrough resistances are obtained for the particular filter elements F1, F2.

The filter medium of the present invention may altogether have a pressure drop/flow(through) resistance in the range from 0.1 Pa/cm to 500 Pa/cm, in particular from 0.5 Pa/cm to 400 Pa/cm and preferably from 1 Pa/cm to 300 Pa/cm. The filter medium of the present invention thus has altogether low pressure drops/flow(through) resistances, which is a performance advantage, especially since the filter medium of the present invention not only provides outstanding clarification of the fluid in use, but also allows the fluid to be clarified to pass through the filter medium in high amounts/volumes. This is very advantageous when, for example, the filter medium of the present invention is used for NBC protective filters, for example for NBC respirators, since breathing is not excessively restricted/obstructed by the filter medium of the present invention.

As far as the further elaboration of the first filter element F1 is concerned, the present invention may provide that the first filter element F1 comprises at least one first carrier material. The present invention may provide in this context that the first adsorption material is fixed/secured, in particular adhered, to the first carrier material.

The first carrier material in this context should have a three-dimensional structure. In this respect, the first carrier material should be configured as a preferably open-cell foam, more preferably a polyurethane foam, yet more preferably a reticulated polyurethane foam. Usage of foams makes it possible to realize the abovementioned low densities/minimal pressure drops/flowthrough resistances in relation to the first filter element F1 in the manner of the present invention. A corresponding adjustment can also be effected via the pore size of the carrier—foam, in particular—used.

In this respect, the average pore diameter of the foam should be at least twice the size, in particular at least two and a half times the size and preferably at least three times the size of the particle diameter, in particular average particle diameter $D_{50}$ of the first adsorption material. This also provides an appropriately low pressure drop/low flow(through) resistance.

In addition, the loading amount of the first adsorption material in relation to the first filter element F1 should be in the range from 5 to 90 wt %, in particular from 10 to 85 wt %, preferably from 15 to 80 wt % and more preferably from 20 to 75 wt %, based on the first filter element F1.

As far as the first carrier material used for the first filter element F1 is further concerned, the first carrier material should be gas pervious, in particular air pervious. In this context, the first carrier material should have a gas perviousness, in particular air perviousness, of at least $10\ l \cdot m^{-2} \cdot s^{-1}$, in particular at least $30\ l \cdot m^{-2} \cdot s^{-1}$, preferably at least $50\ l \cdot m^{-2} \cdot s^{-1}$, more preferably at least $100\ l \cdot m^{-2} \cdot s^{-1}$ and most preferably at least $500\ l \cdot m^{-2} \cdot s^{-1}$, and/or up to $10\ 000\ l \cdot m^{-2} \cdot s^{-1}$, in particular up to $20\ 000\ l \cdot m^{-2} \cdot s^{-1}$, at a flow resistance of 127 Pa. In addition, the first carrier material should have a higher level of gas perviousness, in particular air perviousness, than the second carrier material used for the second filter element F2.

The first filter element F1 is obtainable in a conventional manner. Thus, an adhesive may initially be applied to the carrier material and any excess adhesive removed from the carrier material, for example by squeezing off, in which case the loading with the adsorption material may take place next. With regard to the adhesive used, reference may also be made to what follows.

As far as moreover the second filter element F2 is concerned, the present invention provides in particular that the second filter element F2 comprises at least one second carrier material. In this context, the second adsorption material should be fixed/secured, in particular adhered, to the second carrier material.

The second carrier material as such should have a two-dimensional and/or sheetlike structure. More particularly, the second carrier material should be configured as a sheet material. This makes it possible to provide filter elements of high density and hence high pressure drop/flow(through) resistance.

The second carrier material should further be a textile sheet material, preferably an air-pervious textile material, preferably a woven, knitted, laid or bonded textile fabric, in particular a fibrous non-woven web (a nonwoven). In this respect, the second carrier material has a basis weight in the range from 5 to 800 g/m², in particular from 10 to 500 g/m² and preferably from 25 to 400 g/m².

The second carrier material should further be a textile sheet material containing or consisting of natural fibers and/or synthetic fibers (manufactured fibers). In this context, the natural fibers may be selected from the group of wool fibers and cotton fibers (CO). The synthetic fibers should be selected from the group of polyesters (PES); polyolefins, in particular polyethylene (PE) and/or polypropylene (PP); polyvinyl chlorides (CLF); polyvinylidene chlorides (CLF); acetates (CA); triacetates (CTA); polyacrylonitrile (PAN); polyamides (PA), in particular aromatic, preferably flameproof polyamides (e.g., NOMEX®); polyvinyl alcohols (PVAL); polyurethanes; polyvinyl esters; (meth)acrylates; polylactic acids (PLA); activated carbon and mixtures thereof.

In an embodiment which is preferred for the purposes of the present invention, the second filter element F2 comprises at least two plies and/or at least two units of the second carrier material. In this respect, it may be provided according to the present invention that the second adsorption material is disposed between the plies and/or units of the second carrier material. This embodiment accordingly results in a sandwich-type construction in relation to the second filter element F2, wherein the adsorption material is surrounded on both sides by the particular second carrier materials.

The second carrier material should further be gas pervious, in particular air pervious. In this context, the second carrier material should have a gas perviousness, in particular air perviousness, of at least $5\ l \cdot m^{-2} \cdot s^{-1}$, in particular at least $20\ l \cdot m^{-2} \cdot s^{-1}$, preferably at least $30\ l \cdot m^{-2} \cdot s^{-1}$, more preferably at least $80\ l \cdot m^{-2} \cdot s^{-1}$ and most preferably at least $200\ l \cdot m^{-2} \cdot s^{-1}$, and/or up to $8000\ l \cdot m^{-2} \cdot s^{-1}$, in particular up to $15\ 000\ l \cdot m^{-2} \cdot s^{-1}$, at a flow resistance of 127 Pa. In this context, the second carrier material should have a lower level of gas perviousness, in particular air perviousness, than the first carrier material of the first filter element F1. This is another way for the pressure drop/flow(through) resistance of the second filter element F2 to be controlled and, in particular, increased in a specific manner.

In addition, having regard to the second filter element F2, the loading amount of the second adsorption material should be in the range from 10 to 98 wt %, in particular from 15 to 95 wt %, preferably from 20 to 90 wt % and more preferably from 30 to 85 wt %, based on the second filter element F2.

A person skilled in the art also has in-principle knowledge of how to obtain the second filter element F2. In one possible particular procedure, a first carrier material, particularly in the form of a fibrous nonwoven web, is coated with an adhesive, the adhesive being applied discontinuously, in particular dot-wise or in the form of a mesh, for example via spunbonded processes or the like. The adsorption material may be applied at the same time or subsequently. The present invention may provide more particularly that two or more layers of the adsorption material are applied in effect to the carrier material, for example by a repeated sequence of adhesive application and application of adsorbents. Finally, a further carrier material may be applied atop the fixed adsorbents, resulting in the abovementioned sandwich-type structure for the second filter element F2. With regard to the adhesive used, reference may also be made to what follows.

In relation to the second filter element F2, however, the second carrier material can in principle also be eschewed. More particularly, the second filter element F2 may be a carrierless structure comprising or consisting of adsorber particles interbonded via an adhesive. More particularly, the binder used in the form of an adhesive mesh, for example, may equally form a matrix embedding/fixing the adsorber material. This makes it possible in particular to increase the packing density/loading amount of the second adsorption material and hence the (material-related) density of the second filter element F2 as a whole. Higher pressure drops/flow (through) resistances are the corresponding results.

In general, a specifically heat-tacky adhesive, preferably a hot-melt adhesive, in particular based on a moisture-crosslinking and/or heat-crosslinking, specifically reactive hot-melt glue, preferably polyurethane based, may be used to effect the fixing and/or securing, in particular the adhering of the specifically granular first adsorption material to the first carrier material and/or of the specifically granular second adsorption material to the second carrier material, independently of each other. In this context, the adhesive should cover the outer surface of the specifically granular first adsorption material and/or of the specifically granular second adsorption material independently of each other to an extent of at most 50%, in particular at most 40%, preferably at most 30%, preferably at most 20% and more preferably at most 10%.

The adsorption materials used in relation to the filter medium of the present invention may consist of or comprise a multiplicity of materials that form the corresponding particles/corpuscles.

The present invention may provide in particular that the first adsorption material and/or the second adsorption material are each independently selected from the group of (i) activated carbon, in particular granular activated carbon, preferably spherical activated carbon and/or in particular molded and/or extruded activated carbon and/or pulverulent activated carbon; (ii) zeolites, in particular natural and/or synthetic zeolites; (iii) molecular sieves, in particular zeolitic molecular sieves, synthetic molecular sieves and/or in particular synthetic molecular sieves based on carbon, oxides and/or glasses; (iv) metal oxide and/or metal particles; (v) ion exchanger resins, in particular polydisperse and/or monodisperse cation and/or anion exchangers, in particular of the gel type and/or macroporous type; (vi) inorganic oxides, in particular silicon dioxides, silica gels and/or aluminum oxides; (vii) porous organic polymers and/or porous organic-inorganic hybrid polymers and/or organometallic scaffolding materials, in particular MOFs (Metal Organic Framework), COFs (Covalent Organic Framework), ZIFs (Zeolith Imidazolate Framework), POMs (Polymer Organic Material) and/or OFCs; (viii) mineral granules; (ix) clathrates; and also (x) their mixtures and/or combinations. In particular, the first adsorption material and/or the second adsorption material are each independently formed of specifically particulate activated carbon, in particular of granular, preferably spherical activated carbon.

The particular particle-forming materials of the adsorption materials used according to the present invention are well known to a person skilled in the art, and a person skilled in the art is at all times able to select and coordinate the particular particle-forming materials with a view to endowing the filter medium of the present invention with specific adsorption properties and setting specific pressure drops/flow(through) resistances as per the above comments. Activated carbons usable according to the present invention, which can be used on the basis of spherical activated carbon in particular, are available from Blücher GmbH, Erkrath, Germany or from Adsor-Tech GmbH, Premnitz, Germany, for example. In addition, commonly assigned European patent application EP 1 918 022 A1 and also the US 2008/0107589 A1 equivalent, the disclosure of each of which is hereby fully incorporated herein by reference, can be referenced with regard to the microporous activated carbon useful according to the present invention.

Regarding, furthermore, further details regarding usable MOF materials for the purposes of the present invention, international patent application WO 2009/096184 A1 and also the equivalent German patent application DE 10 2008 005 218 A1, the disclosure of each of which is hereby fully incorporated herein by reference, can be referenced in particular.

It may further be provided in an embodiment which is in accordance with the present invention that the first adsorption material and the second adsorption material each include or consist of at least essentially identical particle-forming materials, in particular as defined above. For example, spherical activated carbon in particular can be used for the first and the second adsorption material.

In addition, the first adsorption material and the second adsorption material should each independently have particle sizes, in particular particle diameters, of at least 0.001 mm, in particular at least 0.01 mm, preferably at least 0.1 mm and more preferably at least 0.2 mm. According to the present invention, it may additionally be provided that the first adsorption material and the second adsorption material each independently have particle sizes, in particular particle diameters, in the range from 0.001 mm to 5 mm, in particular from 0.01 mm to 3 mm, preferably from 0.2 mm to 2 mm, more preferably from 0.2 mm to 1.5 mm and yet more preferably from 0.3 mm to 1 mm.

The first adsorption material and the second adsorption material should further each independently have an average particle size, in particular an average particle diameter $D_{50}$, of at least 0.01 mm, in particular at least 0.05 mm, preferably at least 0.1 mm, more preferably at least 0.2 mm and yet more preferably at least 0.3 mm. Equally, the first adsorption material and the second adsorption material each independently may have an average particle size, in particular an average particle diameter $D_{50}$, in the range from 0.01 mm to 4 mm, in particular from 0.05 mm to 2 mm, preferably from 0.1 mm to 1.5 mm, more preferably from 0.2 mm to 1.2 mm and yet more preferably from 0.3 mm to 1 mm.

The particle sizes/diameters in question may be determined on the basis of the ASTM D2862-97/04 method for example. In addition, the aforementioned quantities may be determined using methods of determination which are based on sieve analysis, x-ray diffraction, laser diffractometry or the like. The particular methods of determination are well known as such to a person skilled in the art, making further comment unnecessary.

It may further be provided according to the concept of the present invention that the first adsorption material and the second adsorption material each independently have a specific surface area (BET surface area) of at least 250 $m^2/g$, in particular at least 500 $m^2/g$, preferably at least 750 $m^2/g$ and more preferably at least 1000 $m^2/g$. Equally, it may be provided that the first particulate adsorption material and/or the second particulate adsorption material each independently have a specific surface area (BET surface area) in the range from 300 $m^2/g$ to 4000 $m^2/g$, in particular from 400 $m^2/g$ to 3000 $m^2/g$, preferably from 500 $m^2/g$ to 2500 $m^2/g$ and more preferably from 600 $m^2/g$ to 2000 $m^2/g$.

Determining the specific surface area as per BET forms part of the in-principle knowledge of a person skilled in the art. All BET surface area particulars relate to the determination as per ASTM D6556-04. The method which the present invention utilizes in particular for determining the BET surface area is the multipoint BET method of determination (MP-BET) in the partial pressure range $p/p_0$ from 0.05 to 0.1.

Typically, the first adsorption material and the second adsorption material may each independently have an adsorption volume $V_{ads}$ of at least 250 $cm^3/g$, in particular at least 300 $cm^3/g$, preferably at least 325 $cm^3/g$ and more preferably at least 350 $cm^3/g$. In this connection, the first adsorption material and the second adsorption material may each independently have an adsorption volume $V_{ads}$ in the range from 250 $cm^3/g$ to 3000 $cm^3/g$, in particular from 300 $cm^3/g$ to 2000 $cm^3/g$ and preferably from 350 $cm^3/g$ to 2500 $cm^3/g$.

The adsorption volume $V_{ads}$ is well known to a person skilled in the art as a quantity for characterizing the particulate adsorption materials used. The methods of determination in this regard are also well known per se to a person skilled in the art. More particularly, the adsorption volume $V_{ads}$ is the weight-specific adsorbed $N_2$ volume, which is generally determined at a partial pressure $p/p_0$ of 0.995.

The first adsorption material and the second adsorption material may further each independently have a Gurvich total pore volume of at least 0.2 $cm^3/g$, in particular at least 0.3 cm³/g, preferably at least 0.4 cm³/g and more preferably at least 0.6 cm³/g. More particularly, the first adsorption material and/or the second adsorption material may each independently have a Gurvich total pore volume in the range from 0.2 cm³/g to 2.0 cm³/g, in particular from 0.3 cm³/g to 1.5 cm³/g, preferably from 0.4 cm³/g to 1.2 cm³/g and more preferably from 0.5 cm³/g to 1.0 cm³/g.

The Gurvich method of determining the total pore volume is a method of measurement/determination that is known per se to a person skilled in the art. For further details regarding the Gurvich method of determining the total pore volume, reference may be made for example to L. Gurvich (1915), J. Phys. Chem. Soc. Russ. 47, 805, and also to S. Lowell et al., Characterization of Porous Solids and Powders: Surface Area Pore Size and Density, Kluwer Academic Publishers, Article Technologies Series, pages 111 ff.

The present invention may provide in particular that the first adsorption material and the second adsorption material each independently have a pore volume formed by pores having pore diameters ≤2 nm, in particular a carbon black method micropore volume, which is in the range from 0.1 cm³/g to 2 cm³/g, in particular from 0.2 cm³/g to 1.5 cm³/g, preferably from 0.3 cm³/g to 1.1 cm³/g and more preferably from 0.4 cm³/g to 1 cm³/g. More particularly, from 20% to 95%, in particular from 30% to 95% and preferably from 40% to 90% of the total pore volume of the first adsorption material and/or of the second adsorption material may be formed by pores having pore diameters of 2 nm, in particular by micropores.

The carbon black method of determination is known per se to a person skilled in the art, so no further details are required in this regard. In addition, regarding further details of determining the pore surface and the pore volume by the carbon black method, reference may made for example to R. W. Magee, Evaluation of the External Surface Area of Carbon Black by Nitrogen Adsorption, presented at the meeting of the Rubber Division of the American Chem. Soc., October 1994, for example referenced in: Quantachrome Instruments, AUTOSORB-1, AS1 WinVersion 1.50, Operating Manual, OM, 05061, Quantachrome Instruments 2004, Florida, USA, pages 71 ff.

It is equally advantageous for the present invention when the first adsorption material and the second adsorption material each independently have an average pore diameter in the range from 1 nm to 60 nm, in particular from 1 nm to 55 nm, preferably from 1.5 nm to 50 nm and more preferably from 2 nm to 45 nm. The absorption properties may be further improved thereby. The average pore diameter may be determined on the basis of the respective nitrogen sorption isotherms in particular.

The adsorbents used according to the present invention on the basis of the first adsorption material and of the second adsorption material may each independently have a bulk density in the range from 200 g/l to 1000 g/l, in particular from 300 g/l to 900 g/l, preferably from 400 g/l to 800 g/l and more preferably from 500 g/l to 750 g/l. Bulk density may be determined to ASTM B527-93/00 in particular.

It may equally be provided for the purposes of the present invention that the first adsorption material and the second adsorption material each independently have an iodine number in the range from 500 mg/g to 2000 mg/g, in particular from 600 mg/g to 1800 mg/g and preferably from 800 mg/g to 1600 mg/g. The iodine number may be determined to ASTM D4607-94/04 in particular.

It may additionally be provided for the purposes of the present invention that the first adsorption material used and/or the second adsorption material are each independently endowed/impregnated with at least one catalytically active substance and/or with at least one catalyst. In this context, the catalyst and/or the catalytically active substance may be selected for example from metals and metal compounds (as of transition metals, in particular noble metals, for example). The catalyst is preferably selected from the group of copper, cadmium, silver, platinum, palladium, zinc and mercury and also compounds thereof. The amount of catalyst, based on the impregnated adsorption material, may vary between wide limits. In general, the amount of catalyst while based on the impregnated adsorption material, is in the range from 0.01 wt % to 15 wt %, in particular from 0.05 wt % to 12 wt % and preferably from 5 wt % to 12 wt %. The impregnation of the adsorption materials used according to the present invention is known from the prior art. For further details, reference may be made for example to H. v. Kienle, E. Bäder, "Aktivkohle and ihre industrielle Anwendung", Ferdinand Enke Verlag, Stuttgart, 1980, and also to DE 195 19 869 A1, the entire disclosure of which is hereby fully incorporated herein. More particularly, the impregnation may be a so-called ASZM-TEDA impregnation. For example, zinc oxide, triethyldiamine and/or silver may be used as impregnants in this context. As a result of the impregnation, the adsorption material used may thus equally have physiosorptive and chemisorptive properties, which further enhances the performance capability of the filter medium according to the present invention.

It may additionally be provided in accordance with the present invention that the first adsorption material and the second adsorption material differ in at least one physical and/or chemical parameter, in particular wherein the physical and/or chemical parameter may be selected from the group of (i) particle size, in particular average particle size and/or particle diameter, in particular average particle diameter; (ii) specific surface area, in particular BET surface area; (iii) pore volume, in particular adsorption volume and/or total pore volume; (iv) porosity and/or pore distribution, in particular micropore volume fraction of total pore volume and/or average pore diameter; (v) impregnation and/or catalytic endowment and also (vi) particle shape, preferably particle size, in particular average particle size and/or particle diameter, in particular average particle diameter. Equally, parameters concerning the adsorption material used in each case may differ as between the particular first filter elements F1 and/or as between the particular filter elements F2.

It is advantageous in this context for the first adsorption material and the second adsorption material to have different particle sizes, in particular different average particle sizes and/or particle diameters, in particular different average particle diameters. It may be provided in this context that the first adsorption material has a larger particle size, in particular a larger average particle size and/or a larger particle diameter, in particular a larger average particle diameter $D_{50}$, than the second adsorption material. It may equally be provided that the second adsorption material has a smaller particle size, in particular a smaller average particle size and/or a smaller particle diameter, in particular a smaller average particle diameter $D_{50}$, than the first adsorption material. This measure of the present invention, as noted above and particularly in connection with the loading density of the particular filter elements F1, F2 with the adsorption material, makes it possible to adjust the (material-related) density and thus the pressure drop/flow(through) resistance of the filter elements F1, F2 in question, in particular with the proviso that the second filter element F2 has a larger pressure drop/flow (through) resistance than the first filter element F1.

It may be provided in particular that the particle sizes, in particular the particle diameters, particularly the average particle diameters $D_{50}$, of the first adsorption material on the one hand and of the second adsorption material on the other differ from each other by a factor of at least 1.1, in particular at least 1.25, preferably at least 1.5, more preferably at least 2, yet more preferably at least 5 and most preferably at least 10, all based on the smaller particle size value. In addition, it may be provided for the purposes of the present invention that the particle sizes, in particular the particle diameters, particularly the average particle diameters $D_{50}$, of the first adsorption material on the one hand and of the second adsorption material on the other differ by at least 0.001 mm, in particular by at least 0.01 mm, preferably by at least 0.05 mm and more preferably by at least 0.1 mm.

The aforementioned particle size value particulars are more particularly set with the proviso that the first adsorption material has the larger values in respect of the particle size, and/or more particularly with the proviso that the second adsorption material has the values which are smaller in this regard.

According to the present invention, properties/parameters may differ as between the particular first filter elements F1 and/or as between the particular second filter elements F2, for example in the form of different pressure drops/flow(through) resistances, (material-related) densities, carrier materials, loading amounts of the adsorption material, adsorption materials as such, filter element heights and the like, but in particular with the proviso that the first filter elements F1 have smaller pressure drops/flow(through) resistances than the second filter elements F2, or in that the second filter elements F2 have larger pressure drops/flow(through) resistances than the first filter elements F1. For example, the first filter elements F1 forming a block B1 and/or the second filter elements F2 forming a second block B2 may have different properties/parameters, in particular as defined above, within the respective blocks.

In a further embodiment which is in accordance with the present invention, it may additionally be provided that the filter medium has at least one particle and/or aerosol filter layer in addition, and supplementary/complementary, to the filter elements F1, F2. It is preferable in this context for the particle and/or aerosol filter layer to be positioned and/or disposed upstream of the filter elements F1, F2. It is advantageous in particular for the particle and/or aerosol filter layer to be directly upstream of the filter elements F1, F2.

The present invention may further provide in respect of the particle and/or aerosol filter layer that it is configured as an air-pervious textile sheet material, preferably with a basis weight in the range from 1 to 75 g/m$^2$, in particular from 2 to 50 g/m$^2$ and more preferably from 5 to 15 g/m$^2$, formed from fibers having fiber diameters in the range from 10 nm to 5 μm and preferably from 100 nm to 1.1 μm.

The particle and/or aerosol filter layer may equally be configured as a laid or bonded textile fabric, in particular as a fibrous non-woven web (a nonwoven).

More particularly, the particle and/or aerosol filter layer may be a textile sheet material which consists of textile fibers and has meshes or pores bounded by the textile fibers, wherein the textile sheet material has an average pore or mesh size of at most 200 μm, in particular at most 100 μm, preferably at most 75 μm, more preferably at most 50 μm, yet more preferably at most 40 μm and most preferably at most 10 μm.

The particle/aerosol filter layer in this context may have a thickness in the range from 0.001 to 10 mm, in particular from 0.01 to 5 mm, preferably from 0.01 to 1 mm.

The particle/aerosol filter layer may more particularly be configured as a high efficiency penetration or particulate air (HEPA) filter or an ultra low penetration or particulate air (ULPA) filter.

The additional use of a particle/aerosol filter layer leads to a further efficiency enhancement for the filter medium of the present invention, particularly since aerosols/particles are removed from the fluid, in particular gas/gas mixture, preferably air, to be clarified particularly before entry into the particular filter elements F1, F2, which further reduces the dirt load for the subsequent filter elements F1, F2 of the filter medium according to the present invention.

The filter medium according to the present invention may additionally be specifically fitted with an ion exchanger layer, which may in principle be disposed at any point within the filter medium of the present invention. More particularly, the ion exchanger layer in question may be positioned as the element in the first place and/or in the last place. The ion exchanger layer may equally comprise for example a carrier material, in particular a foamed material, for example as defined above for the first filter element F1. The ion exchanger layer may more particularly comprise ion exchangers, such as cation exchangers, known per se to a person skilled in the art, which may be fixed to the carrier. More particularly, the ion exchanger resins mentioned above under (v) for the adsorption materials may be used. Using an additional ion exchanger may achieve a further improvement in filtering efficiency particularly in relation to noxiant or poisonous materials, such as cyclohexane and/or ammonia.

The present invention will now be more particularly elucidated with reference to preferred exemplary embodiments and also drawings/figures depicting comparative examples. In connection with the elucidation of these preferred exemplary embodiments of the present invention, which, however, shall not be construed as limiting the present invention in any way, further advantages, properties, aspects and features of the present invention will also be described.

Figure 2B:
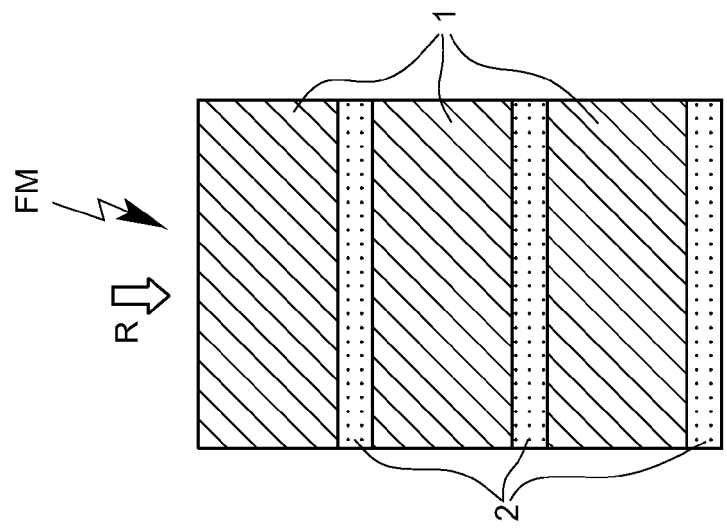
Figure 2C:
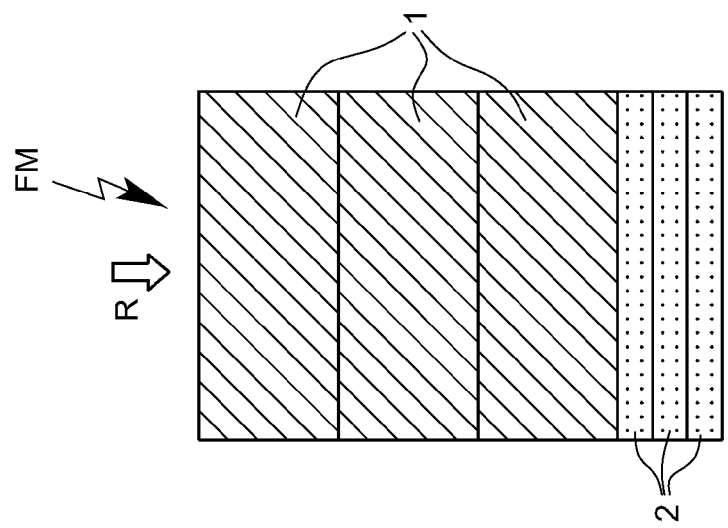
Figure 4D:
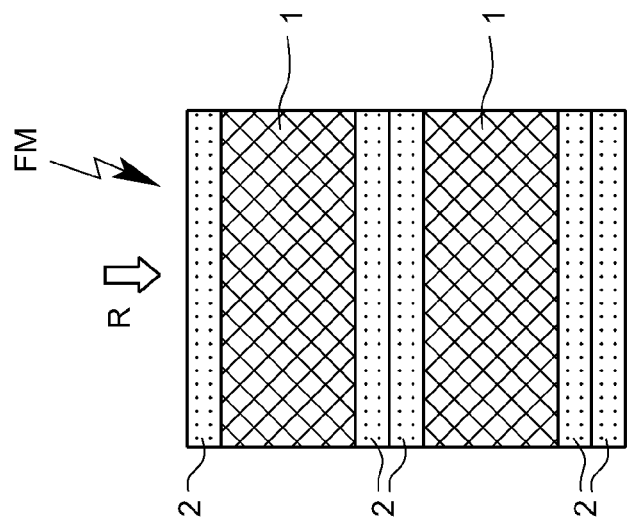
FIG. 4D shows a schematic sectional depiction through a further inventive filter medium FM along the main flowthrough direction R with the numbers and sequences as specified there of the first filter elements F1 and the second filter elements F2, wherein the first filter elements F1 each comprise an adsorption material carrier structure foam slightly compressed to increase the density of the first filter element F1, wherein, however, the density of the first filter elements F1 is lower than the density of the particular second filter elements F2.
Figure 4C:
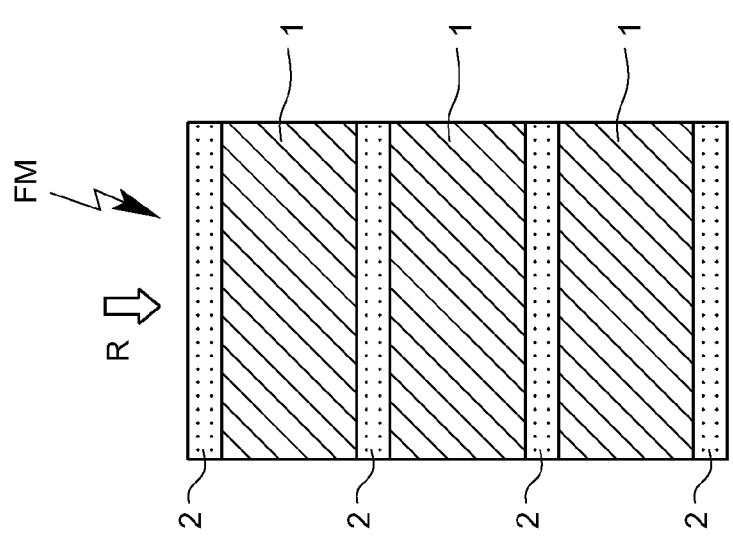
FIG. 4C shows a schematic sectional depiction through an inventive filter medium FM along the main flowthrough direction R, wherein the filter medium FM comprises an alternating sequence of first filter elements F1 and second filter elements F2.
Figure 4A:
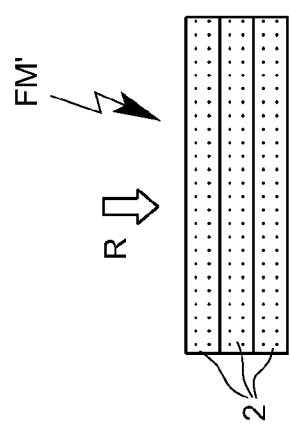
FIGS. 4A and 4B show sectional depictions through comparative filter media FM' and FM'" along the main flowthrough direction R, wherein the particular filter elements FM include exclusively the second filter element F2 in different numbers in each case.
Figure 4B:
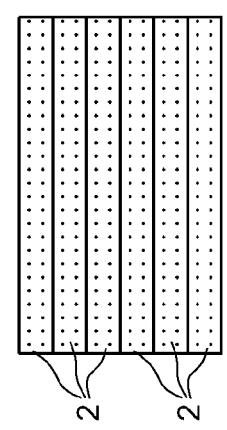
Figure 5:
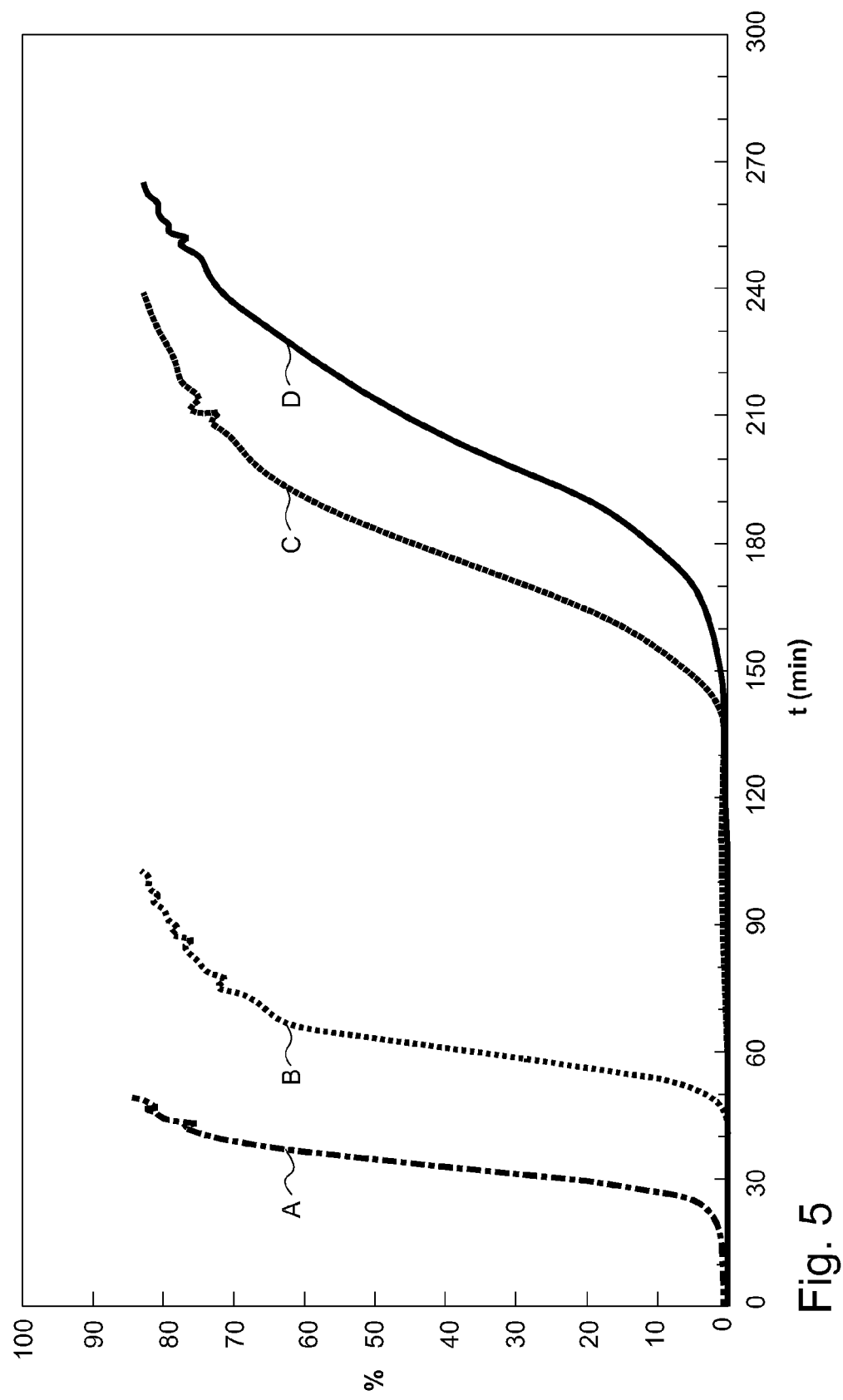
FIG. 5 shows graphic depictions of the break-through behavior and/or breakthrough times of inventive filter media FM (filter media C and D) versus noninventive filter media (filter media A and B).

In the drawings,

FIG. 1 shows a schematic sectional depiction of the inventive filter medium FM along the main flowthrough direction R with the fluid, especially gas/gas mixture, to be clarified, wherein the filter medium FM comprises an alternating sequence between a first filter element F1 and a second filter element F2; detail magnifications of filter elements F1, F2 are also indicated in each case; the filter medium FM in this embodiment further comprises a particle/aerosol filter layer placed directly upstream in the main flowthrough direction R;

FIGS. 2A to 2C show schematic sectional depictions through inventive filter media FM along the main flowthrough direction R with varying numbers and dispositions for the particular first filter elements F1 and the particular second filter elements F2;

FIGS. 3A to 3E show schematic sectional depictions through further inventive filter media FM along the main flowthrough direction R with varying dispositions and numbers for the particular filter elements F1 and the particular filter elements F2;

FIGS. 4A and 4B show sectional depictions through comparative filter media FM' and FM''' along the main flowthrough direction R, wherein the particular filter elements FM include exclusively the second filter element F2 in different numbers in each case;

FIG. 4C shows a schematic sectional depiction through an inventive filter medium FM along the main flowthrough direction R, wherein the filter medium FM comprises an alternating sequence of first filter elements F1 and second filter elements F2;

FIG. 4D shows a schematic sectional depiction through a further inventive filter medium FM along the main flowthrough direction R with the numbers and sequences as specified there of the first filter elements F1 and the second filter elements F2, wherein the first filter elements F1 each comprise an adsorption material carrier structure foam slightly compressed to increase the density of the first filter element F1, wherein, however, the density of the first filter elements F1 is lower than the density of the particular second filter elements F2;

FIG. 5 shows graphic depictions of the break-through behavior and/or breakthrough times of inventive filter media FM (filter media C and D) versus noninventive filter media (filter media A and B).

FIG. 1 thus shows an adsorptive filter medium FM (interchangeably also referred to as a filter unit and/or as a filter structure) particularly for clarification of gases/gas mixtures, preferably air, and/or particularly for removal of chemical/biological poisons/noxiants from gases and/or gas mixtures, preferably air. The inventive filter medium FM shows a plurality of a first filter element F1 or 1 with a first adsorption material 3, in particular in the form of adsorbent particles, and a plurality of a second filter element F2 or 2 which is other than the first filter element F1 or 1 and has a second adsorption material 3', in particular in the form of adsorbent particles. The first filter element F1 or 1 and the second filter element F2 or 2 have mutually different pressure drops/flow(through) resistances.

The depiction as per FIG. 1 shows a schematic construction for the inventive filter medium FM wherein the filter elements F1 or 1 have a lower density and/or a lower degree of loading with the adsorption material 3 and hence a lower pressure drop/flow(through) resistance than the corresponding filter elements F2 or 2, which are in particular configured in the manner of a flat medium of higher density and/or higher degree of loading with the second adsorption material 3' and thus of higher pressure drop/flow(through) resistance (cf. the detail magnifications as per FIG. 1).

As is further clear from FIG. 1, in particular on the basis of the underlying detail magnifications, the filter elements F1 or 1 have a porous carrier 4, in particular an open-cell foam, in the pores of which the first adsorption material 3 is secured/fixed in the form of particulate adsorbents. By contrast, the filter elements F2 or 2 are configured as flat media in that the second adsorption material 3' is fixed in the form of particulate adsorbents atop a second carrier material 5 in the form of a fibrous non-woven web. The construction realized for the filter elements F2 or 2 is in effect of the sandwich type in that the second adsorption material 3' is bounded on both sides by particular layers/plies of the second carrier material 5 and is disposed between the particular layers/plies of carrier material 5. Owing to the specific construction of filter elements F2 or 2, higher pressure drops/flow(through) resistances accordingly result for them compared with the first filter elements F1 or 1.

As is further discernible from FIG. 1, the second filter elements F2 or 2 have lower heights h2 than the respective first filter elements F1 or 1 with corresponding heights h1. The construction of the inventive filter medium FM as per FIG. 1 is such that the particular first filter elements F1 or 1 and the particular second filter elements F2 or 2 are disposed alternately/alternatingly in the inventive filter medium FM, while the last element in the downstream direction is a second filter element F2 or 2 and the filter element which is positioned in the first place in the upstream direction is a first filter element F1 or 1. It is accordingly the case that, in the main flowthrough direction R, it is a first filter element F1 or 1 which is positioned in the first place and a second filter element F2 or 2 which is positioned in the last place, within the inventive filter medium FM.

The filter medium FM as per FIG. 1 additionally includes a particle/aerosol filter layer 6 placed directly upstream of filter elements F1 or 1 and F2 or 2 in the main flowthrough direction R, thereby further prolongating the in-service/on-stream time of filter medium FM according to the present invention, particularly since binding of subsequent filter elements F1 F2 with the aerosol- and/or particle-shaped substances from the fluid is avoided/reduced. As the depiction as per FIG. 1 further reveals, the first filter elements F1 or 1 and also the second filter elements F2 or 2 have at least essentially identical diameters d1 or d2, respectively. The filter medium FM of the present invention is based on the particular first and second filter elements F1 or 1 and F2 or 2, respectively, and also on the particle/aerosol filter layer 6 and has a resulting overall height $h_{total}$, as depicted in FIG. 1.

As noted above, the inventive filter medium FM thus comprises filter elements based on first filter elements F1 or 1 and second filter elements F2 or 2, which may vary not only in relation to their numbers but also in relation to their dispositions within the inventive filter medium FM. The invention accordingly provides structures of varying/custom-tailored construction, which have alternating and/or periodic density differences in particular with regard to the main flowthrough direction R in particular, as may be intentionally set/predetermined via the sequence and concrete selection of the particular first and second filter elements F1 and F2, respectively. Thus, this embodiment of the present invention, as depicted in FIG. 1, results in inventive filter media FM having periodic density differences which comprise a specific sequence of low density regions and high density regions within the filter medium FM. In this context, it has proved particularly advantageous for the purposes of the present invention when filter elements of comparatively high density/pressure drop/flow (through) resistance, in particular the second filter elements F2 or 2, are disposed downstream of filter elements having by comparison a lower density/pressure drop/flow(through) resistance, in particular downstream of the first filter elements F1 or 1.

It has also proved particularly advantageous for the last filter element in the downstream direction of the inventive filter medium FM to be at least one filter element F2 or 2 having higher densities/higher pressure drop/higher flow (through) resistance than the filter elements placed directly upstream thereof.

FIG. 2A shows a blockwise arrangement based on respectively three filter elements F1 or 1 and three filter elements F2 or 2 wherein the first block of three first filter elements F1 or 1 precedes a second block of three filter elements F2 or 2 in the main flowthrough direction R. In this context, FIG. 2B shows a further, periodic arrangement of filter elements F1 or 1 and F2 or 2 which underly the inventive filter medium FM in that individual filter elements F1 or 1 and F2 or 2 form an alternating/periodic arrangement. FIG. 2C finally shows a further inventive filter medium FM with a periodically blockwise arrangement for the filter elements F1 or 1 and F2 or 2 underlying the inventive filter medium in that there is an alternating sequence of altogether four blocks where a block of two first filter elements F1 or 1 alternates with a block of two second filter elements F2 or 2.

The depictions as per FIG. 3A to FIG. 3E can be referenced for further inventive ways to dispose the filter elements F1 or 1 and F2 or 2 underlying the inventive filter medium FM.

Equally, the depictions as per FIG. 4C and also FIG. 4D show inventive adsorptive filter media FM having an alternating arrangement of filter elements F1 or 1 and F2 or 2 in that FIG. 4C (filter medium C) shows an alternating sequence of a single first filter element F1 or 1 and a single second filter element F2 or 2, while FIG. 4D (filter medium D) shows a periodic arrangement between a single filter element F1 or 1 and a block of two second filter elements F2 or 2. What is common to the arrangements or filter media FM as per FIG. 4C and FIG. 4D is that at least one second filter element F2 or 2, i.e., a filter element of higher density/pressure drop/flow (through) resistance compared with filter elements F1 or 1 is positioned/disposed in the downstream direction as the last element or, respectively, last filter elements. This is believed—without wishing to be tied to this theory—to bring about a certain degree of uniformization for the fluid, in particular gas/gas mixture, preferably air, flowing through the inventive filter medium FM, leading to the fluid to be clarified enjoying a longer residence time in filter elements F2 or 2 in particular in order thereby to improve the adsorption efficiency.

The inventive filter media FM—when compared with non-inventive filter media FM' (filter medium A) and FM''' (filter medium B), as depicted in FIG. 4A and FIG. 4B, which are based on a succession of merely one filter element type, viz., filter elements of high pressure drop/flow(through) resistance based on the second filter element F2 or 2—have distinctly improved breakthrough properties, as depicted in FIG. 5.

Figure depictions elucidated above will also be further elucidated once more to a partial extent at least in the context of the exemplary embodiments of the present invention.

Further elaborations, variations, modifications, modulations, particularities and advantages of the present invention will be readily apparent to and realizable by the ordinarily skilled on reading the description without their having to go outside the realm of the present invention.

The present invention is illustrated by the following exemplary embodiments which, however, shall not limit the present invention in any way.

What is provided in the context of the present invention is overall an extremely capable filter medium having improved breakthrough properties for the noxiant/poisonous materials to be removed/adsorbed which further has an altogether low pressure drop/flow(through) resistance, particularly since only some of the filter elements used, in particular the second filter elements F2, have an increased density without this, however, being prejudicial to the overall properties of the inventive filter medium regarding the flowthrough properties in that it is in fact productive of the effect of the present invention: a significant improvement in the breakthrough properties.

The present invention further provides—in accordance with a second aspect of the present invention—a method whereby the filter medium of the present invention, as defined above, is used in the manner of the present invention for sorptive, in particular adsorptive applications, preferably for gas cleaning/gas purification, preferably for air cleaning and/or air purification.

The present invention also further provides—in accordance with a third aspect of the present invention—a method of using the filter medium of the present invention, as defined above, for the removal of noxiants, specifically gaseous noxiants, or of gases or substances that are toxic, harmful and/or environmentally damaging, preferably chemical and/or biological poison and/or noxiant materials.

The present invention yet further provides—in accordance with a fourth aspect of the present invention—filters and filter materials, in particular for removal of noxiant, odorant and poisonous materials of any kind, in particular from air and/or gas streams, such as NBC respirator filters, odor filters, sheet filters, air filters, in particular filters for indoor air cleaning, adsorption-capable carrier structures and filters for the medical sector, obtained using at least one filter medium as described above.

EXEMPLARY EMBODIMENTS

1. Production of Inventive Filter Media

The inventive filter media FM are produced by first producing the particular first filter elements F1 and the second filter elements F2:

The first filter elements F1 are produced using an open-cell foam which, before loading with the particle-shaped adsorption material based on activated carbon, is drenched/treated with an adhesive or with an adherent composition. This is followed by loading with the particulate adsorption material based on spherical activated carbon having an average particle diameter $D_{50}$ of about 0.5 mm. Excess adhesive/adherent may be removed, for example by squeezing off the foam (by calendering or the like, for example), before curing in particular. Adsorption material in excess, i.e., not fixed atop the foamed material, is equally removed.

Cylinder-shaped first filter elements F1 having a diameter D1 of about 10 cm and a height h1 of about 2 cm are obtained. These first filter elements F1 have a density of about 300 kg/m³ and an about 70 wt % loading with the particle-shaped adsorption material, based on the first filter element F1.

The first filter elements thus obtained are found to have a 6.4 cm/sec superficial velocity or DIN EN 14387 pressure drop of about 1.3 Pa/cm.

In a possible procedure for producing the second filter elements F2, a first carrier material is formed, for example by spraying a mesh from threads of adhesive, for example on a turntable using a rotary atomizer. The second adsorption material is then applied atop the carrier material thus provided, and is fixed by curing the adhesive/adherent. Subsequently, a further mesh formed from threads of adhesive may be applied atop the previously fixed adsorbent or atop the adsorbent layer, optionally by renewed application of a further adsorbent layer. The aforementioned steps of applying threads and/or a mesh of adhesive with the subsequent application of a further adsorption layer may be repeated more than once in order to adjust loading/density of the adsorption material and thus the desired pressure drop/flow(through) resistance of the particular second filter elements F2 in this way also. Optionally, one or two further carrier layers, based on a fibrous non-woven web, for example, may be applied as upper and/or lower covering layers. The layered material thus obtained may be brought to the desired dimensions, in particular by cutting-to-size or the like.

Cylinder-shaped second filter elements F2 having a diameter d2 of about 10 cm and a height h2 of about 3 to 4 mm are obtainable in this way. The second filter elements thus obtained have a density of 440 kg/m³. The degree of loading with the second adsorption material is about 80 wt %, based on the second filter element F2.

The particular second filter elements F2 have a 6.4 m/sec superficial velocity or DIN EN 14387 pressure drop of about 30.5 Pa/cm.

The inventive filter media FM are obtained by appropriate stacking/conjoining of the first filter elements F1 and second filter elements F2 in numbers and arrangements/dispositions which can be varied in each case, while the particular filter elements F1, F2 may be fixed atop each other, for example via dot-shaped adhering or by applying an adhesive mesh or the like.

2. Properties of Inventive Filter Media FM (i) A first test is carried out to test the breakthrough behavior of various arrangements of the particular first filter elements F1 and second filter elements F2 in relation to hydrogen sulfide ($H_2S$) under ABEK 1 requirements (cf. DIN EN 14387). A first filter medium FM' tested in this regard comprises three plies of the abovementioned second filter element F2 (cf. FIG. 4A, filter medium A, comparator). Inventive filter media FM1 and FM2 are also tested, with the inventive filter medium FM1 comprising a sequence made up of a block of two first filter elements F1 and a block of three second filter elements F2. The inventive filter medium FM2 comprises an alternating sequence of altogether three first filter elements F1 and three second filter elements F2 (sequence: F1-F2-F1-F2-F1-F2). The test is carried out by disposing the particular filter media such that, in relation to the filter media FM1 and FM2, the respective first filter element F1 is positioned upstream.

The first (comparative) filter medium FM' is found to produce breakthrough times in the range from 65 to 107 min (when measured as stack or in the canister, i.e., on installing the filter medium in a placing or housing). The inventive filter medium FM1 gives breakthrough times which exceed those of filter medium FM' by a factor of about 1.8. The inventive filter medium FM2 equally gives significantly prolonged breakthrough times, which exceed the breakthrough times of the noninventive filter medium FM' by a factor of about 2. The concept of the present invention is thus the basis for achieving altogether distinctly improved filtering properties, particularly with regard to prolonged breakthrough times.

(ii) A further series of tests is carried out to investigate the influence of a third filter element F3 comprising an ion exchanger in the form of an anion exchanger on the filter media FM while the ion exchanger material is equally fixed atop an open-cell foam. This filter element F3, based on an ion exchanger, was placed as a flat layer directly downstream of the above-described filter media FM' and also FM1 and FM2. The result is a further increase in breakthrough time, which is distinctly higher for the inventive filter media FM1 and FM2 than for the noninventive filter medium FM'.

Figure 3A:
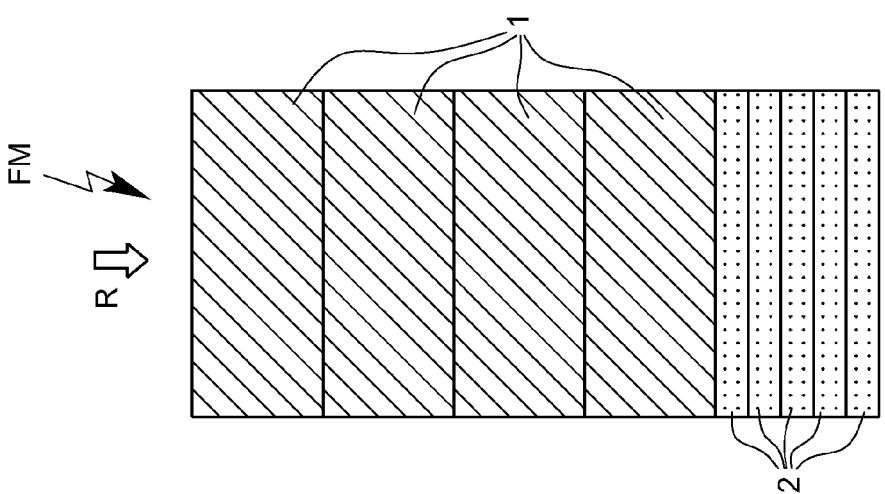
FIGS. 3A to 3E show schematic sectional depictions through further inventive filter media FM along the main flowthrough direction R with varying dispositions and numbers for the particular filter elements F1 and the particular filter elements F2.
Figure 3B:
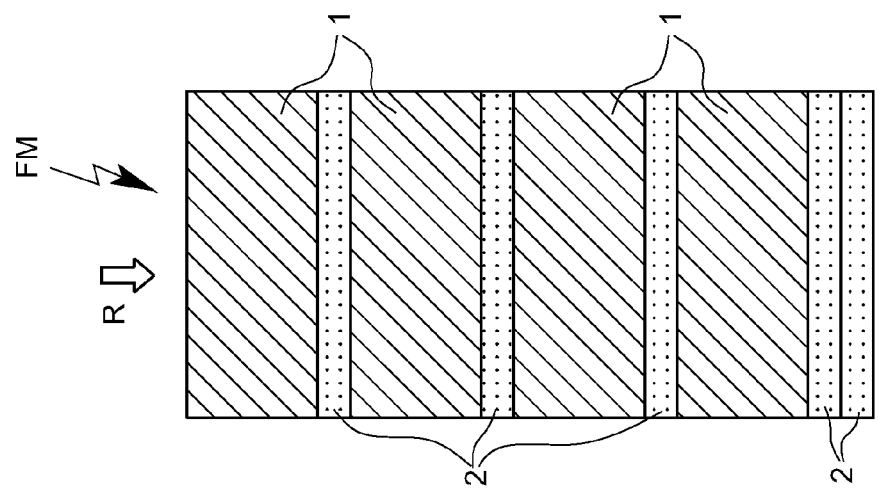
Figure 3C:
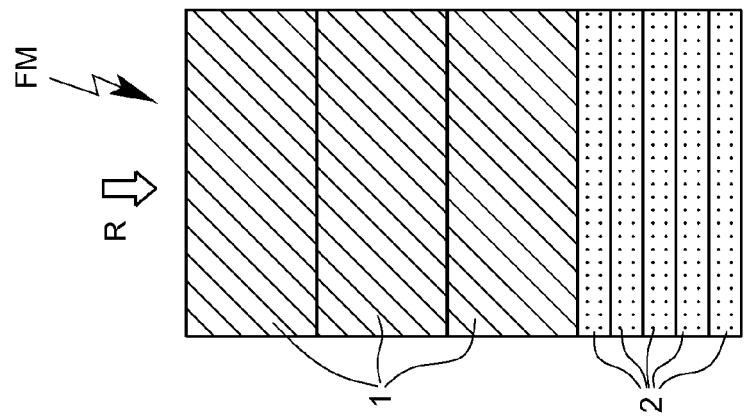
Figure 3E:
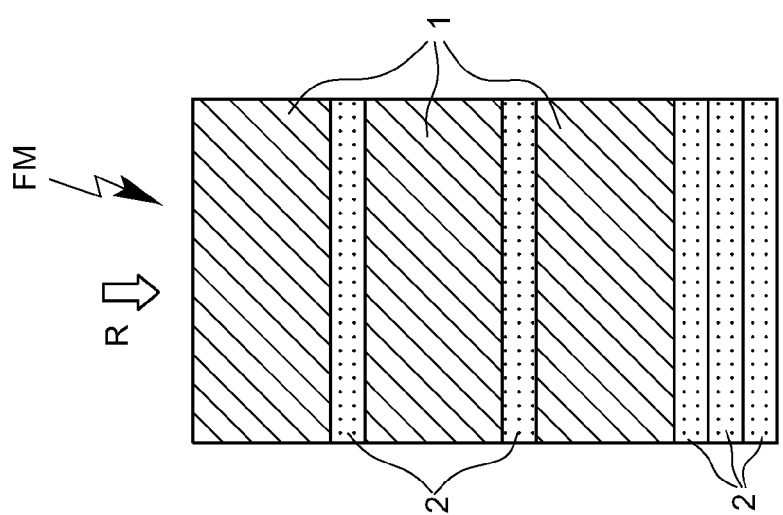
Figure 3D:
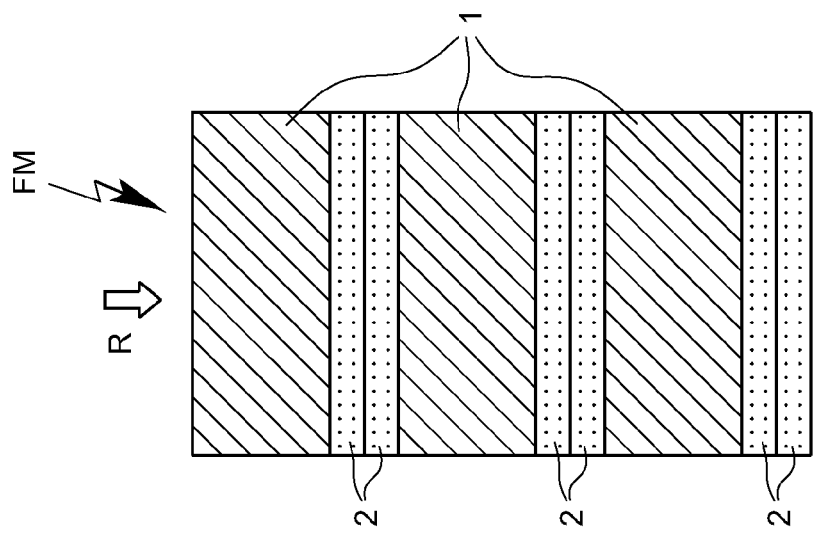

(iii) A further complex of tests is carried out to determine the breakthrough behavior of various inventive filter media FM3 to FM7, the inventive filter medium FM3 having the construction shown in FIG. 3A, the inventive filter medium FM4 having the construction shown in FIG. 3B, the inventive filter medium FM5 having the construction shown in FIG. 3C, the inventive filter medium FM6 having the construction shown in FIG. 3D and finally the inventive filter medium FM7 having the construction shown in FIG. 3E, based on the first filter elements F1 and the second filter elements F2. The comparator is a noninventive filter medium FM", which has eight second filter elements F2.

The breakthrough times are determined for cyanogen chloride ClCN at an air flow of 30 l/min with a ClCN concentration of 4000 mg/m$^3$ at 24° C. and a relative humidity of 80%. The breakthrough time determined relates to a breakthrough of 5 mg/m$^3$.

The comparative filter material FM" is found to give a breakthrough time of 9 min. The breakthrough times determined for the inventive filter media FM4 to FM7 are significantly superior thereto, as follows:

Filter element FM" 9 min
Filter element FM3 32 min
Filter element FM4 70 min
Filter element FM5 19 min
Filter element FM6 53 min
Filter element FM7 67 min The specific arrangement and combination of the first and second filter elements F1 and F2 underlying the inventive filter media FM3 to FM7 thus provides—in an utterly surprising manner—a significant prolongation of breakthrough time.

(iv) A further series of tests was carried out on two further inventive filter media FM8 and FM9, which respectively have the construction shown in FIG. 4C (filter element C) and the construction shown in FIG. 4D (filter element D). The particular layers based on the first filter element F1 are slightly compressed for inventive filter element FM9 compared with inventive filter medium FM8, so somewhat higher pressure drops/flow(through) resistances result in this regard, although they continue to be lower than those of the second filter element F2. These inventive filter media FM8 and FM9 are tested for breakthrough behavior in relation to the substance cyclohexane versus noninventive filter media FM' (filter element A) and also FM''' (filter element B) (cf. FIG. 4A and FIG. 4B). The pressure drop of the particular filter media is also determined.

The underlying tests are determined at an airflow of 30 l/min with a cyclohexane concentrate of 1000 ppm at 20° C. and a relative humidity of 70%. The underlying superficial velocity was about 6.4 cm/sec. Breakthrough time was determined for a cyclohexane breakthrough of 10 ppm.

In this context, the following breakthrough times and also the following pressure drops were determined for the filter media in question:

|      | Breakthrough time | Pressure drop |
| --- | --- | --- |
| FM'  | 19 min  | 23 Pa |
| FM''' | 47 min | 50 Pa |
| FM8  | 140 min | 34 Pa |
| FM9  | 147 min | 69 Pa |

The related breakthrough curves are also depicted in FIG. 5.

The tests verify the significantly improved breakthrough behavior of inventive filter media FM8 and FM9 over the corresponding comparative filter media FM' and FM''', while the overall pressure drop of the inventive filter media FM8 and FM9 is also low, which may be advantageous, depending on the specific application.

In conclusion, the properties of the filter media according to the present invention with regard to the adsorption properties in respect of toxic substances are distinctly improved over the prior art.

The invention claimed is:

1. An adsorptive filter medium for purification of gases and gas mixtures,
   wherein the filter medium comprises:
      a plurality of a first filter element having a first adsorption material in the form of adsorbent particles, and
      a plurality of a second filter element which is different from the first filter element and has a second adsorption material in the form of adsorbent particles;
   wherein the first adsorption material and the second adsorption material are each independently formed from granular activated carbon, wherein the first filter elements and the second filter elements are disposed in stack form or stacked atop each other, wherein at least one first filter element is disposed upstream of at least one second filter element, wherein the first filter element and the second filter element have mutually different pressure drops and/or mutually different flow resistances, wherein the second filter element has a greater pressure drop and/or flow resistance than the first filter element, and wherein it is a second filter element which is disposed in the downstream direction as the filter element which is positioned in the last place, wherein the second filter element positioned in the last place in the downstream direction has a higher pressure drop and/or flow resistance than the filter elements disposed upstream of the filter element positioned in the last place.

2. The filter medium as claimed in claim 1,
wherein the filter medium is bounded in the upstream direction by at least one first filter element.

3. The filter medium as claimed in claim 1,
wherein the first filter element positioned in the first place in the downstream direction has a lower pressure drop and/or flow resistance than the filter elements disposed downstream of the filter element which is positioned in the first place.

4. The filter medium as claimed in claim 1,
wherein the first filter elements and the second filter elements are disposed alternatingly and/or mutually alternately and/or periodically.

5. The filter medium as claimed in claim 1,
wherein the first and/or second filter elements are disposed blockwise.

6. The filter medium as claimed in claim 1,
wherein the first filter elements and/or the second filter elements are disposed alternatingly blockwise.

7. The filter medium as claimed in claim 1,
wherein the filter medium and/or the first filter element and/or the second filter element are box shaped, cuboid shaped or cylinder shaped.

8. The filter medium as claimed in claim 1,
wherein the first filter element and the second filter element have at least essentially identical breadths and/or depths and/or at least essentially identical diameters, based on the extent transversely and/or perpendicularly to the main flowthrough direction.

9. The filter medium as claimed in claim 1, wherein the density of the first filter element is less than the density of the second filter element.

10. The filter medium as claimed in claim 1,
wherein the pressure drop and/or flow resistance of the second filter element exceeds by a factor in the range from 1.5 to 300 the pressure drop and/or flow resistance of the first filter element.

11. The filter medium as claimed in claim 1,
wherein the ratio of the pressure drop and/or flow resistance of the second filter element to the pressure drop and/or flow resistance of the first filter element is in the range from 500:1 to 1.5:1.

12. The filter medium as claimed in claim 1,
wherein the first filter element has a pressure drop and/or flow resistance in the range from 0.1 Pa/cm to 100 Pa/cm and wherein the second filter element has a pressure drop and/or flow resistance in the range from 1 Pa/cm to 250 Pa/cm, with the proviso that the pressure drop and/or flow resistance of the second filter element is greater than the pressure drop and/or flow resistance of the first filter element.

13. The filter medium as claimed in claim 1,
wherein the first filter element comprises at least one first carrier material, wherein the first adsorption material is fixed to the first carrier material and wherein the first carrier material has a three-dimensional structure; and wherein the second filter element comprises at least one second carrier material, wherein the second adsorption material is fixed to the second carrier material and wherein the second carrier material has a sheetlike structure.

14. The filter medium as claimed in claim 1,
wherein the first adsorption material and/or the second adsorption material are each independently formed from spherical activated carbon.

15. The filter medium as claimed in claim 1,
wherein the first adsorption material and/or the second adsorption material each independently have particle sizes in the range from 0.001 to 5 mm.

16. The filter medium as claimed in claim 1,
wherein the first adsorption material and the second adsorption material differ in at least one physical and/or chemical parameter, wherein the physical and/or chemical parameter is selected from the group of (i) particle size; (ii) specific surface area (BET surface area); (iii) pore volume; (iv) porosity; (v) pore distribution; (vi) impregnation and/or catalytic endowment and (vii) particle shape.

17. The filter medium as claimed in claim 1,
wherein the first adsorption material and the second adsorption material have different particle sizes, wherein the first adsorption material has a larger particle size than the second adsorption material.

18. The filter medium as claimed in claim 1,
wherein the particle sizes of the first adsorption material, on the one hand, and of the second adsorption material, on the other hand, differ from each other by at least 0.01 mm, with the proviso that the second adsorption material has the smaller sizes.

19. The filter medium as claimed in claim 1,
wherein the filter medium additionally comprises at least one particle and/or aerosol filter layer.

20. A method of using a filter medium as claimed in claim 1 for sorptive applications, for gas cleaning, for gas purification, for air cleaning or for air purification.

21. A method of using a filter medium as claimed in claim 1 for the removal of noxiants or of gases or substances that are toxic, harmful or environmentally damaging or of chemical and/or biological poison and/or noxiant materials.

22. A filter or a filter material for removal of noxiant, odorant and poisonous materials of any kind from air and/or gas streams, with the filter or filter material comprising at least one filter medium as claimed in claim 1.

23. The filter or filter material as claimed in claim 22, wherein the filter or filter material is selected from the group consisting of NBC respirator filters, odor filters, sheet filters, air filters, filters for indoor air cleaning, adsorption-capable carrier structures and filters for the medical sector.

* * * * *